US009993677B2

(12) United States Patent
Todokoro

(10) Patent No.: US 9,993,677 B2
(45) Date of Patent: Jun. 12, 2018

(54) JUNGLE GYM JOINT AND JUNGLE GYM

(71) Applicant: AGATSUMA CO., LTD, Tokyo (JP)

(72) Inventor: Shinji Todokoro, Tokyo (JP)

(73) Assignee: AGATSUMA CO.. LTD., Tokyo (JP)

( * ) Notice: Subject to any disclaimer, the term of this patent is extended or adjusted under 35 U.S.C. 154(b) by 177 days.

(21) Appl. No.: 15/224,932

(22) Filed: Aug. 1, 2016

(65) Prior Publication Data

US 2017/0056699 A1   Mar. 2, 2017

(30) Foreign Application Priority Data

Aug. 31, 2015 (JP) ................................. 2015-170728

(51) Int. Cl.
*A63B 17/00* (2006.01)
*A63B 17/02* (2006.01)
(Continued)

(52) U.S. Cl.
CPC ............... *A63B 17/00* (2013.01); *A63B 7/00* (2013.01); *A63B 9/00* (2013.01); *A63B 17/02* (2013.01);
(Continued)

(58) Field of Classification Search
CPC .. A63B 1/00; A63B 1/005; A63B 3/00; A63B 7/00; A63B 7/02; A63B 9/00;
(Continued)

(56) References Cited

U.S. PATENT DOCUMENTS 2,532,444 A * 12/1950 Germana ................. A63G 9/00
297/344.13
3,841,631 A * 10/1974 Dolan .................. A63B 71/023
108/15
(Continued)

FOREIGN PATENT DOCUMENTS

EP    2 256 355 A1    12/2010
JP      10238521 A     9/1998
(Continued)

OTHER PUBLICATIONS

English translation of JP3102074 (filed Mar. 17, 2004).*
Extended European Search Report for Application No. 16179905.1-1658 dated Jan. 2, 2017.

*Primary Examiner* — Andrew S Lo
*Assistant Examiner* — Gary D Urbiel Goldner
(74) *Attorney, Agent, or Firm* — The Marbury Law Group, PLLC

(57) ABSTRACT

A jungle gym joint has a joint main body including joint shafts to which pipes are connected and rotary members. The pipe is connected to one end and a folding portion is formed at the other end of the rotary member, the folding member being formed by a flat plate portion being held in a bifurcate portion together with the joint main body. A cover member including engaging projections on an inner circumferential surface is provided on an outer circumference of the folding portion. The cover member is guided to move back and forth in an axial direction by the engaging projections being brought into engagement with guide grooves.

(Continued)

The folding portion is restricted from being folded with the cover member staying in an advanced end position while the restriction of folding thereof can be released with the cover member staying in a withdrawal end position.

20 Claims, 18 Drawing Sheets

(51) Int. Cl.
| | |
|---|---|
| *A63B 17/04* | (2006.01) |
| *A63B 7/00* | (2006.01) |
| *A63B 71/04* | (2006.01) |
| *A63B 9/00* | (2006.01) |
| *A63G 21/00* | (2006.01) |
| *A63G 31/00* | (2006.01) |
| *F16B 7/04* | (2006.01) |
| *A63G 9/00* | (2006.01) |

(52) U.S. Cl.
CPC .............. *A63B 17/04* (2013.01); *A63B 71/04* (2013.01); *A63G 9/00* (2013.01); *A63G 21/00* (2013.01); *A63G 31/00* (2013.01); *F16B 7/042* (2013.01); *F16B 7/0446* (2013.01); *A63B 2009/006* (2013.01); *A63B 2210/50* (2013.01)

(58) Field of Classification Search
CPC ... A63B 2009/006; A63B 17/00; A63B 17/02; A63B 17/04; A63B 71/0054; A63B 71/02; A63B 71/04; A63B 71/023; A63B 2071/0072; A63B 2071/0081; A63B 2071/009; A63B 2071/026; A63B 2071/027; A63B 2210/00; A63B 2210/50; A63B 2210/58; A63B 2225/009; A63B 2225/0093; A63G 9/00; A63G 21/00; A63G 31/00; F16B 7/042; F16B 7/0446
See application file for complete search history.

(56) References Cited

U.S. PATENT DOCUMENTS

| | | | | |
|---|---|---|---|---|
| 3,850,428 A | * | 11/1974 | Zuber | ...................... A63B 9/00 482/36 |
| 3,971,561 A | * | 7/1976 | Wenzel | .................. A63B 17/04 472/116 |
| 5,555,987 A | | 9/1996 | Yoshimura et al. | |
| 8,376,294 B2 | * | 2/2013 | Steury | ...................... A63G 9/00 248/202.1 |
| 9,868,008 B2 | * | 1/2018 | Todokoro | .................. A63B 9/00 |
| 2010/0304935 A1 | * | 12/2010 | Todokoro | .................. B25B 7/02 482/35 |
| 2012/0100940 A1 | * | 4/2012 | Hajarian | .............. A63B 63/004 473/476 |
| 2012/0157266 A1 | * | 6/2012 | Todokoro | .................. A63B 9/00 482/35 |
| 2016/0250508 A1 | * | 9/2016 | Todokoro | .................. A63B 9/00 482/35 |
| 2016/0250509 A1 | * | 9/2016 | Todokoro | .................. A63B 9/00 403/53 |

FOREIGN PATENT DOCUMENTS

| | | |
|---|---|---|
| JP | 2003117022 A | 4/2003 |
| JP | 3102074 U | 3/2004 |
| JP | 3116831 U | 12/2005 |

* cited by examiner

JUNGLE GYM JOINT AND JUNGLE GYM

CROSS REFERENCE TO RELATED APPLICATION

This application is based on and claims the benefit of priority under 35 USC 119 of Japanese Patent Application No. 2015-170728 filed on Aug. 31, 2015, the entire disclosure of which, including the specification, claims, drawings and abstract, is incorporated herein by reference.

BACKGROUND OF THE INVENTION

Field of the Invention

The present invention relates to a jungle gym with which infants can play indoors and which can be folded up for storage and a jungle gym joint that can be used for this jungle gym.

Description of the Related Art

There have conventionally been proposed jungle gyms with which infants can play indoors. These indoor jungle gyms are made up of a combination of a plurality of three-dimensional or solid frames and can constitute indoor play equipment with which infants can play entrancingly indoors as they do with jungle gyms set in outdoor play yards such as a park.

These indoor jungle gyms tend to be formed large in size. Owing to this, when not in use, the jungle gyms need to be folded up compact for storage, and to make this happen, as joints where constituent pipes are connected, joints are used which include folding portions where the pipes are folded. Then, these folding portions include a lock mechanism for preventing the pipe connected thereto from being folded in an abrupt and unintended fashion when the jungle gym is used. For example, a joint unit of a folding jungle gym disclosed in Japanese Utility Model Registration No. 3102074 includes a rotation preventive cover sleeve that is provided so as to move freely back and forth at a pivotal connecting portion between a fixed pipe joint and a rotatable pipe joint. Then, a lock pin is provided on the movable pipe joint to which a pipe is connected, and a lock pin receiving hole is provided on the rotation preventive cover sleeve.

When using this jungle gym, the rotation preventive cover sleeve is placed over the pivotal connecting portion. Then, the rotation preventive cover sleeve is brought into abutment with the rotatable pipe joint, whereby the pipe is prevented from being folded at the pivotal connecting portion. At the same time, the lock pin on the rotatable pipe joint fits in the lock pin receiving hole on the rotation preventive cover sleeve, whereby the rotation preventive cover sleeve is prevented from rotating about an axis thereof. In addition, when folding up this jungle gym, the lock pin is pushed in so as to be removed from the lock pin receiving hole. Then, the rotation preventive cover sleeve can be moved away from the rotatable pipe joint along the pipe.

In the jungle gym joint described above, the rotation preventive cover sleeve is operated to move towards or away from the folding portion of the pipe that represents the pivotal connecting portion to restrict the folding of the pipe or release the restriction of folding of the pipe (that is, the folding up of the jungle gym). Here, after having released the folding of the pipe, the rotation preventive cover sleeve is not locked on any member. Then, the rotation preventive cover sleeve moves abruptly and unintentionally during a storing operation of the jungle gym from time to time, resulting in a risk of the traveling distance of the rotation preventive cover sleeve being extended long along which the rotation preventive cover sleeve needs to travel to restrict the folding of the folding portion in deploying the jungle gym again.

SUMMARY OF THE INVENTION

The present invention provides a jungle gym joint that can shorten the time required to fold up a jungle gym for storage and deploy it for use and a jungle gym employing joints like the jungle gym joint.

According to an aspect of the invention, there is provided a jungle gym joint having: a joint main body having joint shafts to which a plurality of pipes are connected; and a rotary member that is formed into a short rod shape and to one end of which the pipe is connected, wherein a folding portion is formed at the other end of the rotary member in which a flat plate portion is held in a bifurcate portion together with the joint main body so as to allow the pipe to be folded up, wherein a cylindrical cover member of which an engaging projection is provided on an inner circumferential surface is provided on an outer circumference of the folding portion, and wherein the cover member is guided so as to move freely back and forth in an axial direction as a result of a guide groove provided on the folding portion being brought into engagement with the engaging projection in such a way that when the cover member is guided to an advanced end position, the cover member restricts the folding portion from being folded by a circumferential wall of the cover member being brought into abutment with the flat plate portion or the bifurcate portion, while when the cover member is in a withdrawal end position, the circumferential wall is not in abutment with the flat plate portion or the bifurcate portion, and the cover member releases the restriction of folding of the folding portion.

In addition, in the jungle gym joint, the guide groove includes a one directional guide groove that guides the cover member so as to rotate in one circumferential direction about an axis thereof when the cover member is in the advanced end position and the other directional guide groove that guides the cover member so as to rotate in the other circumferential direction about the axis thereof when the cover member is in the withdrawal end position.

Additionally, in the jungle gym joint, the one directional guide groove and the other directional guide groove each include a ride-over projecting portion that is formed so that the engaging projection of the cover member can ride thereover.

In addition, in the jungle gym joint, the flat plate portion is formed on the joint main body, and the bifurcate portion is formed on the rotary member.

Additionally, in the jungle gym joint, a projecting end portion of the flat plate portion has a convexly projecting arc shape when seen from thereabove and includes a rotation restricting projection that is provided so as to project therefrom, and a surface of the bifurcate portion that lies between two fork portions thereof and which faces the projecting end portion of the flat plate portion follows the projecting end portion of the flat plate portion to thereby be given a concavely depressed arc shape when seen from thereabove and includes an abutment portion that is provided thereon so as to be brought into abutment with the rotation restricting projection.

According to another aspect of the invention, there is provided a jungle gym having a jungle gym section including the jungle gym joint described above, and a swing section that is connected adjacent to the jungle gym section, wherein the swing section includes two swing support base pipes that are connected to the jungle gym joints at two locations on a setting plane via connecting pipes, two swing support vertical pipes that are connected to the swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each include a support portion that supports the swing support vertical pipe and a sliding cylindrical portion that is fixed to a lower end of the support portion and which is formed on an outer circumference of the swing support base pipe, wherein the sliding cylindrical portions each include a thread portion that is formed on an outer circumference of an end portion thereof which lies opposite to an end portion facing the jungle gym section, and wherein the swing support base pipes each include a thread member that is provided at an end portion thereof which lies opposite to an end portion facing the jungle gym section for threading engagement with the thread portion.

In addition, in the jungle gym described above, an external thread portion is formed at an end portion of each of the swing support base pipes that lies opposite to an end portion thereof that faces the jungle gym section, the connecting pipes and the swing support base pipes are connected to each other via swing support base folding portions, and a swing support base cover member is provided on an outer circumference of each of the swing support base folding portions, the swing support base cover member having an outside diameter that is equal to an outside diameter of the swing support base pipe and including an internal thread portion that is formed on a bore diameter portion for threading engagement with the external thread portion.

In the jungle gym joint according to the invention, the pipes are connected to the rotary members that are connected to the joint shafts of the joint main body and the joint main body via the folding portions. The folding portion is formed by the rotary member and the joint main body with the flat plate portion held in the bifurcate portion. Then, the cylindrical cover member is provided on the outer circumference of the folding portion. This cover member is guided so as to move freely back and forth with the direction towards the cylindrical main body referred to as the front as a result of the guide grooves provided in the folding portion and the engaging projections on the cover member being brought into engagement with each other. When the cover member stays in the advanced end position, the cover member restricts the folding of the folding portion, and when the cover member stays in the withdrawal end position, the cover member releases the restriction of folding of the folding member.

This enables the restriction of folding of the folding portion and the release of the restriction of folding of the folding portion only by operating the cover member so as to move back and forth. In addition, the cover member stops moving at the withdrawal end, and therefore, there is no risk of the cover member moving when the jungle gym is folded up. According to this configuration, when deploying the jungle gym again for use, the cover member only has to be moved over the same distance over which the cover member is moved when the restriction of folding of the folding portion is released. Consequently, the time required to deploy the jungle gym can be reduced compared with the conventional jungle gym.

In addition, the guide groove includes the one directional guide groove that guides the cover member so as to rotate in the one direction and the other directional guide groove that guides the cover member so as to rotate in the other direction. By adopting this configuration, when restricting the folding of the folding portion and releasing the restriction of folding of the folding member, the cover member can be moved back and forth only after the cover member is rotated, and therefore, the risk of moving the cover member back and forth erroneously is reduced.

Additionally, the one directional guide groove and the other directional guide groove each include the ride-over projecting portion that is formed so that the engaging projections on the cover member can ride thereover. Consequently, the user can sense the initiation and completion of the folding restriction and restriction releasing operations of the cover member by feeling a sensation of clicking that is produced when the engaging projections ride over the ride-over projecting portions.

In addition, in the configuration of the folding portion, the flat plate portion is formed on the joint main body, and the bifurcate portion is formed on the rotary member, whereby the guide grooves can be formed on the bifurcate portion. Consequently, the jungle gym joint can be formed with the simple configuration.

Additionally, the angle through which the rotary member rotates relative to the joint main body is restricted by the abutment between the abutment portion provided on the rotary member and the rotation restricting projection provided on the joint main body. Thus, for example, the angle through which the pipe is folded is wanted to be 90 degrees, the folding motion of the pipe can be restricted in an ensured fashion.

The jungle gym according to the invention has the jungle gym section including the jungle gym joint described above, and the swing section that is connected adjacent to the jungle gym section. The swing section includes the two swing support base pipes that are connected to the jungle gym joints at the two locations on the setting plane via the connecting pipes, the two swing support vertical pipes that are connected to the swing support base pipes via the connection support members and which extend upwards while being inclined, the swing support horizontal pipe that is supported detachably at both the ends thereof by the intersecting portion that connects to the two swing support vertical pipes at the upper end portions thereof and the jungle gym section and which spans horizontally between the intersecting portion and the jungle gym section, and the swing that is provided on the swing support horizontal pipe so as to swing freely thereon. Then, the connection support members each include the support portion that supports the swing support vertical pipe and the sliding cylindrical portion that is fixed to the lower end of the support portion and which is formed on the outer circumference of the swing support base pipe. The sliding cylindrical portions each include the thread portion that is formed on the outer circumference of the end portion thereof which lies opposite to the end portion facing the jungle gym section. The swing support base pipes each include the thread member that is provided at the end portion thereof which lies opposite to the end portion facing the jungle gym section for threading engagement with the thread portion.

By adopting this configuration, the sliding cylindrical portions can be moved towards the jungle gym sections along the swing support base pipes by releasing the threading engagement of the thread members with the thread portions. Consequently, the swing section can also be stored compact.

In addition, the external thread portion is formed at the end portion of each of the swing support base pipes that lies opposite to the end portion thereof that faces the jungle gym section. Additionally, the connecting pipes and the swing support base pipes are connected to each other via the swing support base folding portions. The swing support base cover member is provided on the outer circumference of each of the swing support base folding portions and the swing support base cover member has the outside diameter that is equal to the outside diameter of the swing support base pipe and includes the internal thread portion that is formed on the bore diameter portion for threading engagement with the external thread portion. By adopting this configuration, the swing support base pipes can be folded up, and the swing section can be stored more compact by locating the sliding cylindrical portions on the outer circumference of the connecting pipes.

DETAILED DESCRIPTION OF THE PREFERRED EMBODIMENT

Figure 1:
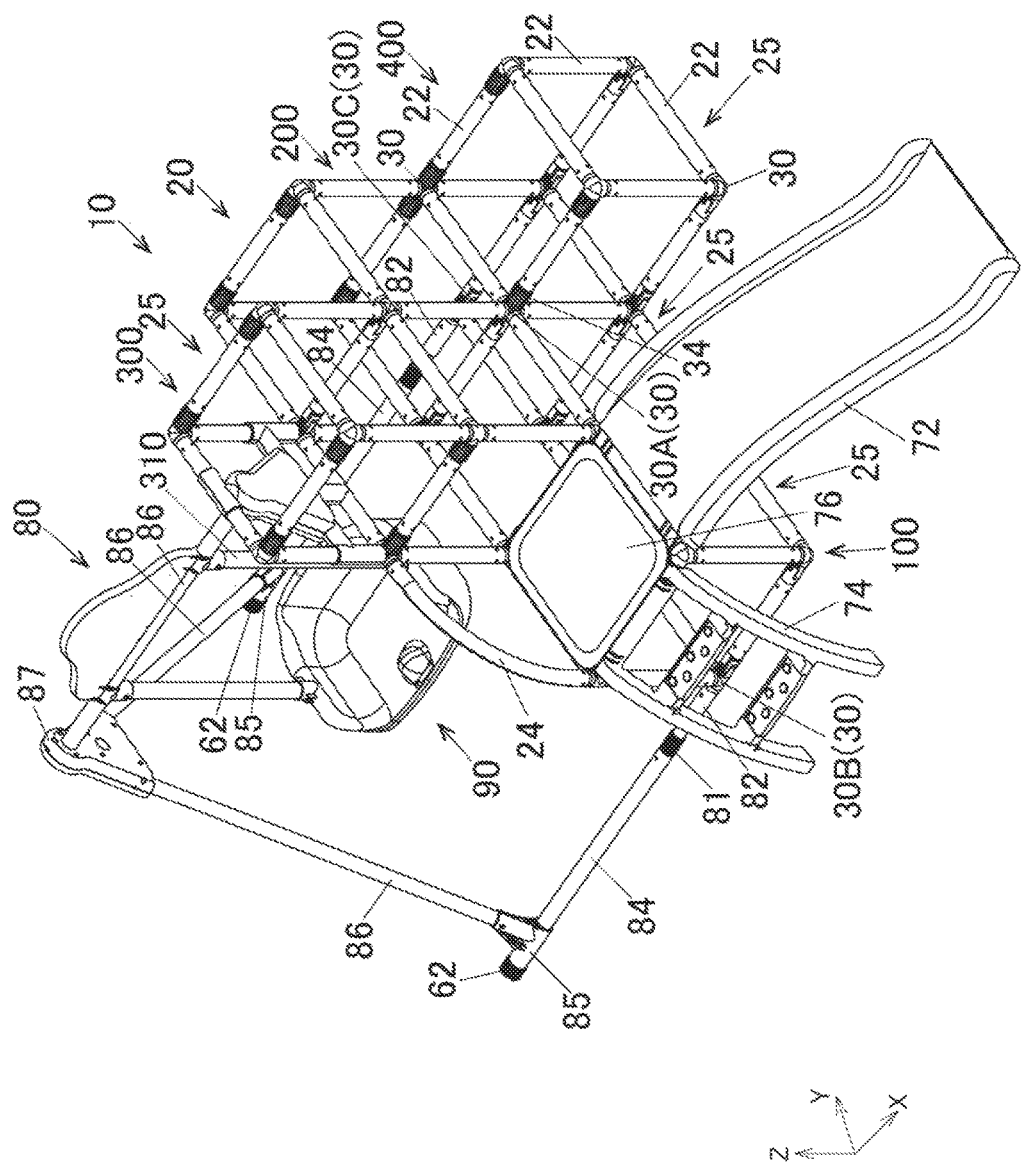
FIG. 1 is a perspective view of a jungle gym according an embodiment of the invention as seen from a jungle gym portion side.
Figure 2:
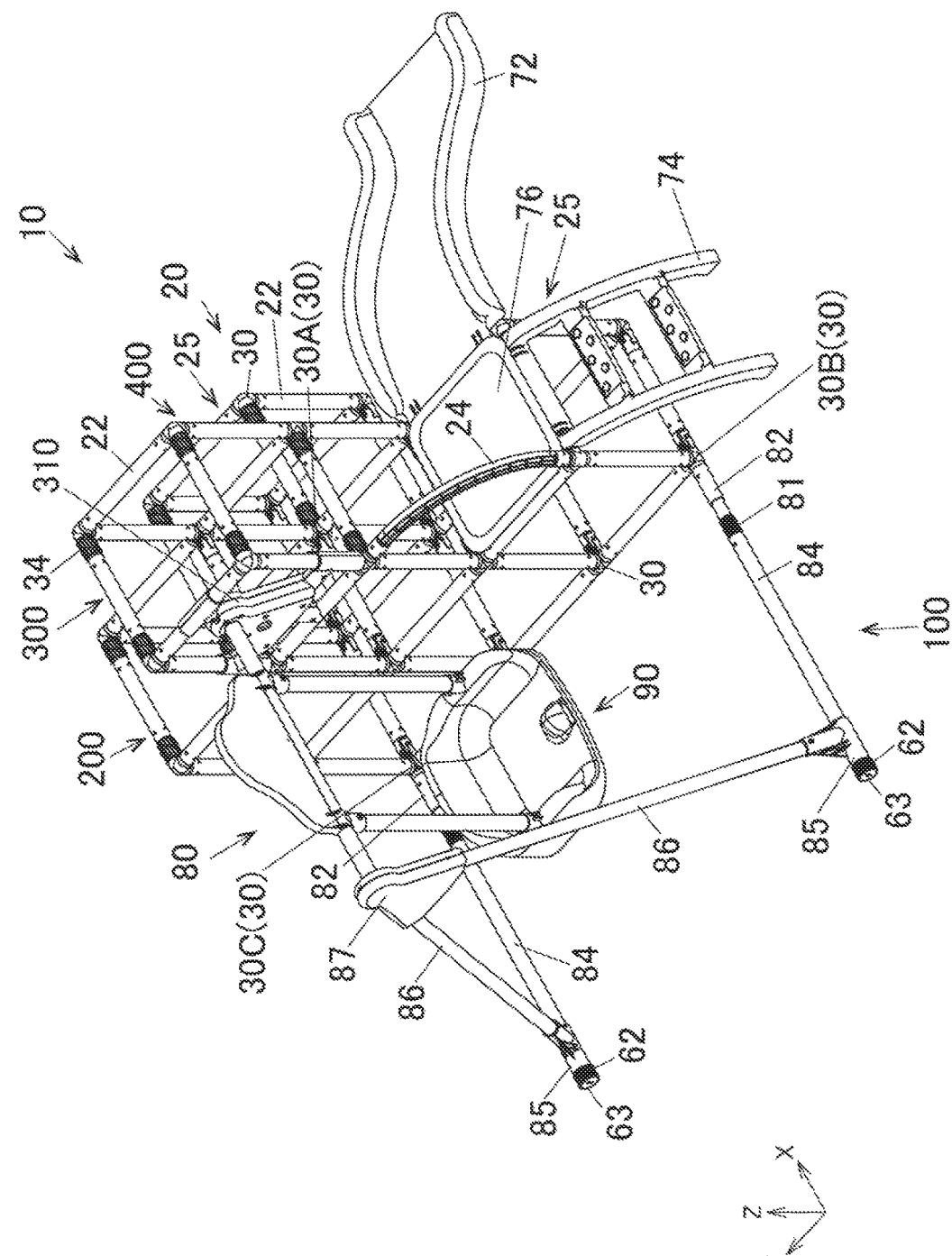
FIG. 2 is a perspective view of the jungle gym according to the embodiment of the invention as seen from a swing portion side.

Hereinafter, an embodiment of the invention will be described based on the drawings. A jungle gym 10 according to this embodiment is play equipment set mainly indoors and is formed so as to be folded up for storage. FIGS. 1 and 2 show a state in which the jungle gym 10 is deployed for use. The jungle gym 10 includes a jungle gym section 20 and a swing section 80. The swing section 80 is connected adjacent to the jungle gym section 20. Then, the jungle gym 20 section includes a slide 72, a ladder 74 and a platform 76.

The jungle gym section 20 includes a plurality of three-dimensional or solid frames 25 that are made up or a plurality of pipes 22 that are provided in the directions of an x axis, a y axis and a z axis and a plurality of jungle gym joints 30 that branch into three to six directions. The jungle gym section 20 is formed into three stages. At a lowermost stage, three solid frames 25 are aligned continuously in the direction of the y axis to thereby form a base frame group 100. A solid frame as an additional base frame 400 is provided at a plus side end portion of the base frame group 100 in the direction of the y axis so as to project in the direction of the x axis.

A middle frame group 200 is provided at a middle stage of the jungle gym section 20, and in this middle frame group 200, two solid frames 25 are formed individually on upper sides (on plus sides in the direction of the z axis) of the two solid frames 25 of the base frame group 100 that lie in the center and at the plus side end portion in the direction of the y axis so as to be aligned continuously in the direction of the y axis. A top frame 300 representing an uppermost stage includes one solid frame 25 that is formed on an upper side (a plus side in the direction of the z axis) of one of the two solid frames 25 of the middle frame group 200 that lies on a minus side in the direction of the y axis.

Each of the solid frames 25 of the jungle gym section 20 is formed by 12 pipes 22 that correspond to sides of the slid frame 25 and jungle gym joints 30 that are situated at vertex portions of the solid frame 25. The jungle gym joints 30 that branch into three to six directions are used depending upon the number of pipes 22 that are connected thereto. In these jungle gym joints 30, connecting portions to which pipes 22 are connected and bending or folding portions where the pipes 22 so connected are can be folded up are constructed in the same way. Consequently, in the following description of the jungle gym joint 30, a jungle gym joint 30A that branches into six directions (that is, a six-way branching joint that is situated at a portion where the base frame group 100 and the additional base frame 400 are connected) will be described as representing the other jungle gym joints 30.

The jungle gym section 20 includes 12 jungle gym joints 30 that branch into three directions (three-way branching joints 30), 9 jungle gym joints 30 that branch into four directions (four-way branching joints 30), 8 jungle gym joints 30 that branch into five directions (five-way branching joints 30) and 1 jungle gym joint 30 that branches into six directions (six-way branching joint 30). Then, pipes 22, a safety guard handrail 24 and connecting pipes 82 are connected to the jungle gym joints 30.

Figure 3:
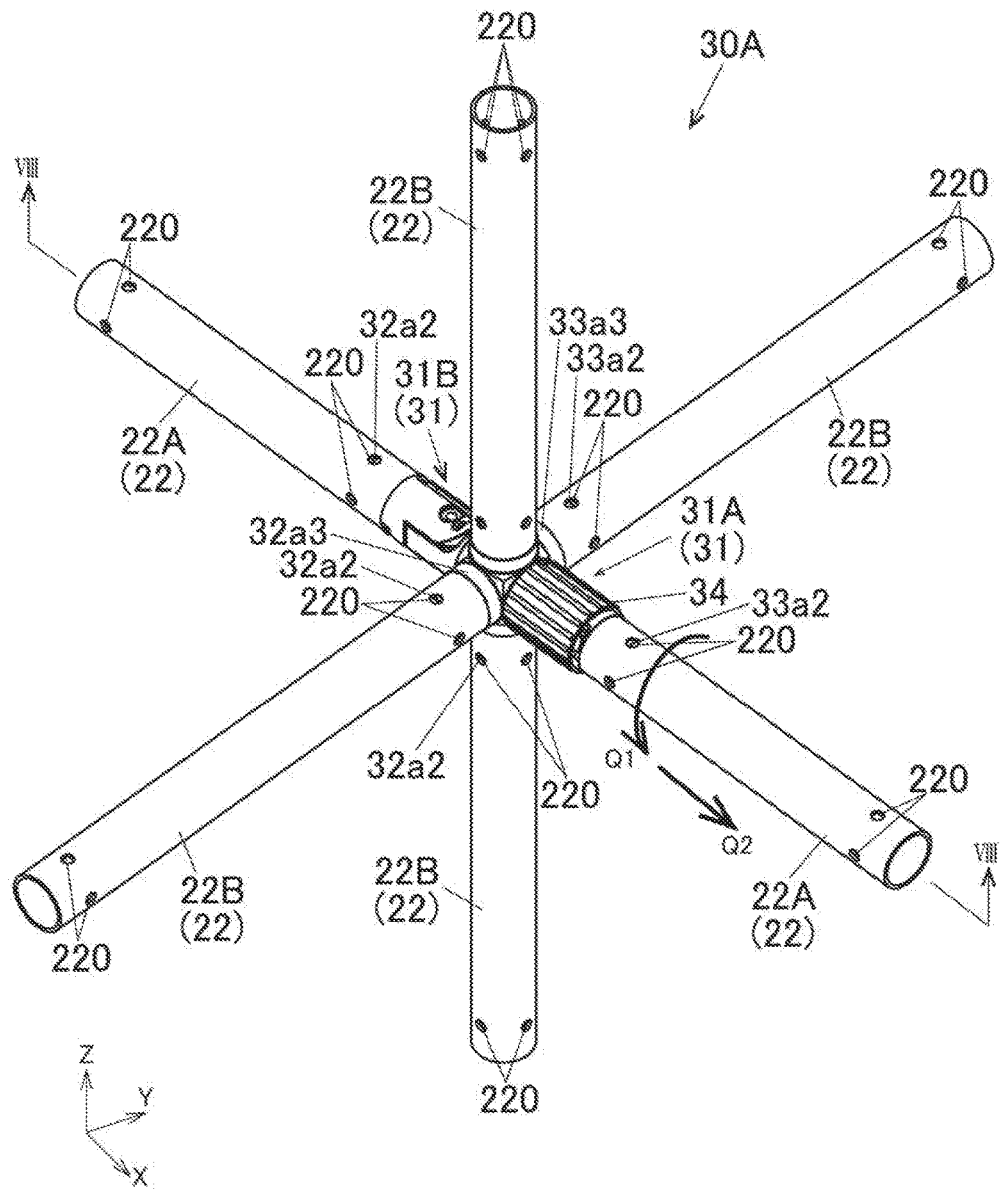
FIG. 3 is a perspective view showing a jungle gym joint and pipes that are connected to the jungle gym joint according to the embodiment of the invention.

As shown in FIG. 3, two pipes 22A extending in the direction of the x axis, two pipes 22B extending in the direction of the y axis and two pipes 22B extending in the direction of the z axis are connected to the jungle gym joint 30A. The pipes 22A and the pipes 22B have the same diameter. The pipes 22A are formed shorter than the pipes 22B. The jungle gym joint 30A includes bending or folding portions 31 (31A, 31B) where the pipes 22 extending in the direction of the x axis can be folded through an angle up to 90 degrees.

A substantially cylindrical cover member 34 is provided on an outer circumference of the folding portion 31A to which the pipe 22A is connected from a plus side in the direction of the x axis. The cover member 34 is made to move freely back and forth in an axial direction of the cover member 34. Here, "forth or front" means a direction moving towards the jungle gym joint 30A (a minus side in the direction of the x axis in FIG. 3), and "back or rear" means a direction moving away from the jungle gym joint 30A (a plus side in the direction of the x axis in FIG. 3).

Figure 4:
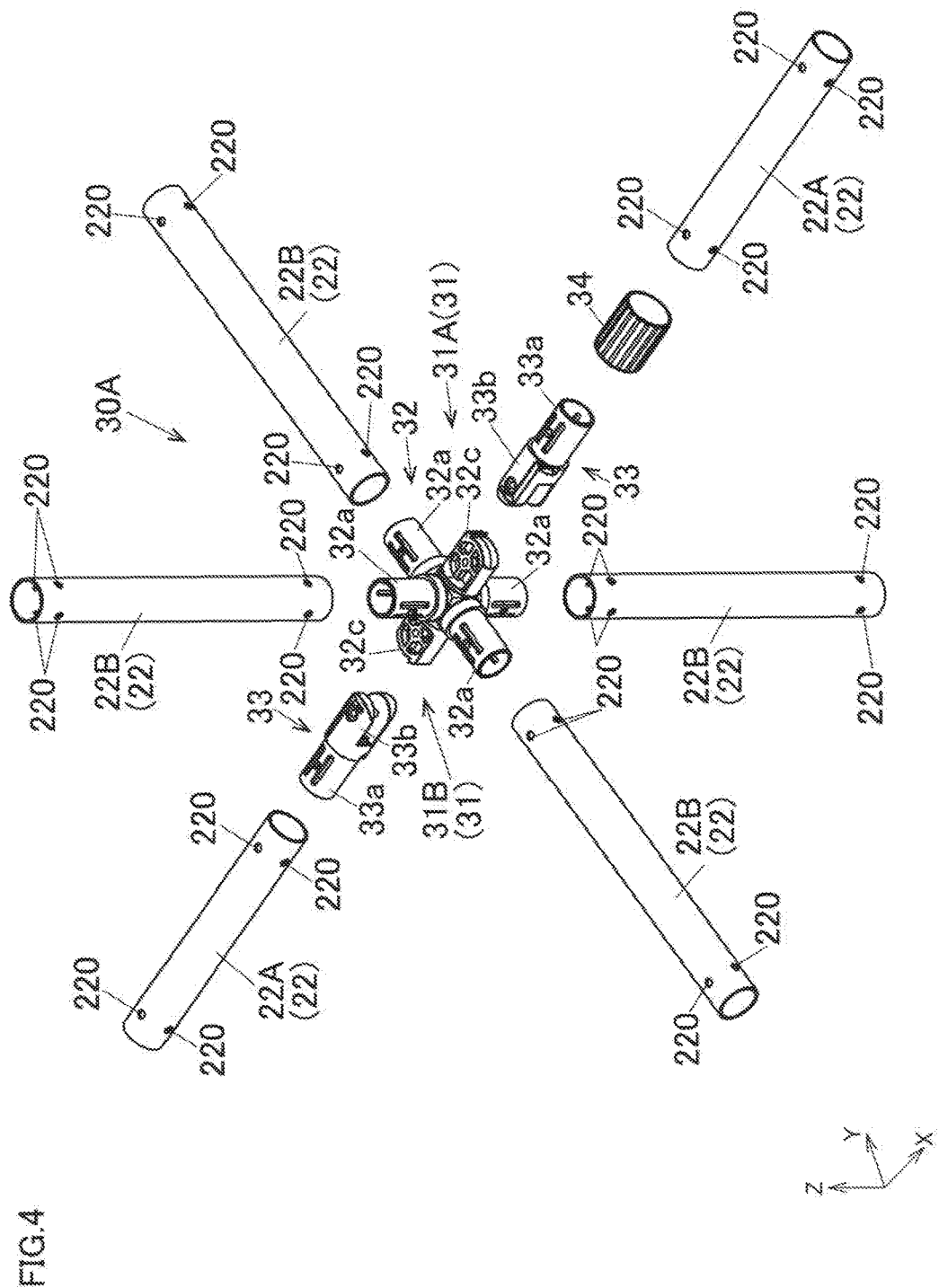
FIG. 4 is an exploded perspective view showing the jungle gym joint and the pipes that are connected to the jungle gym joint according to the embodiment of the invention.
Figure 5:
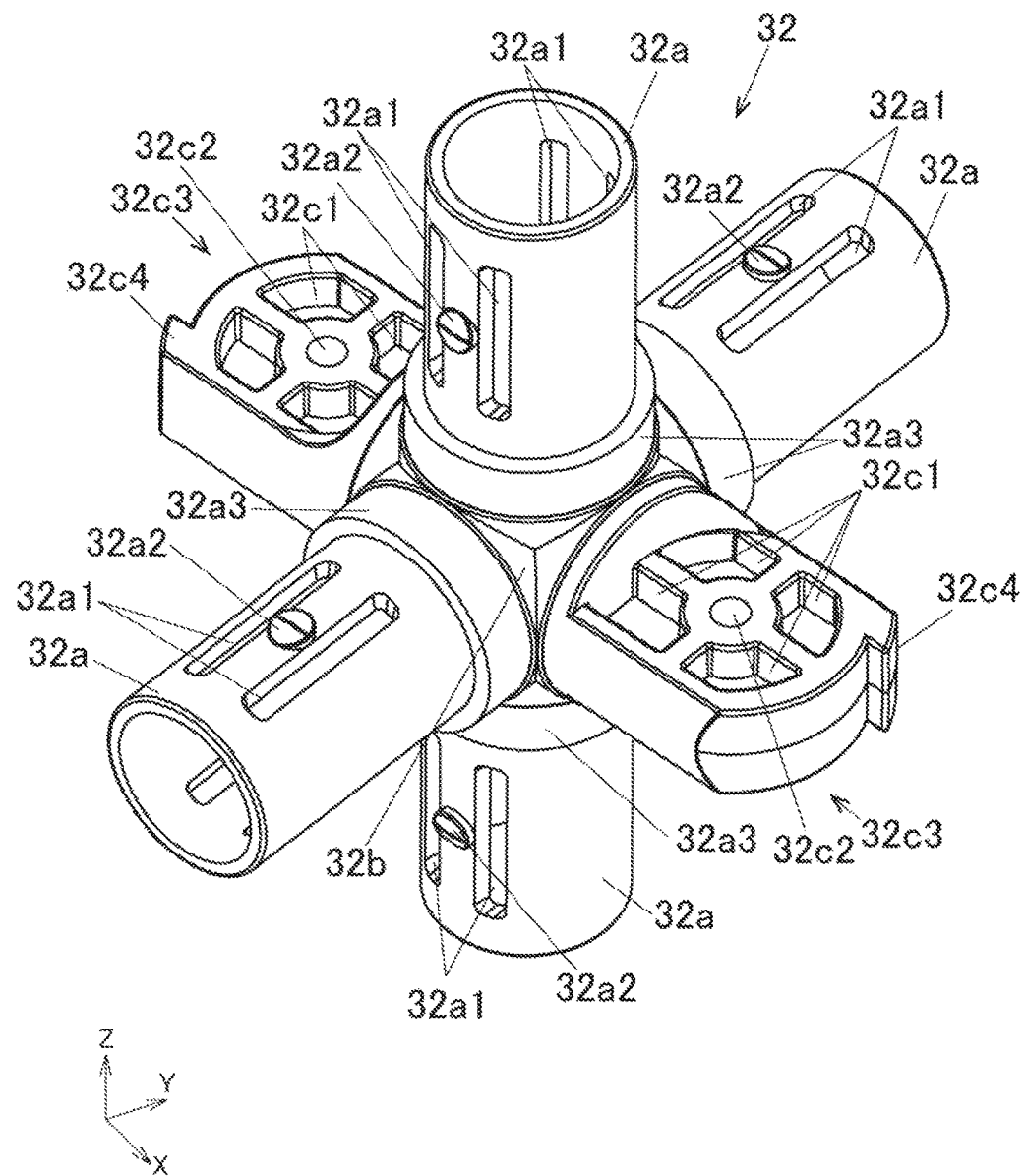
FIG. 5 is a perspective view showing a joint main body according to the embodiment of the invention.

As shown in FIG. 4, the jungle gym joint 30A is made up of a joint main body 32, rotary members 33 that are connected to the joint main body 32 in the direction of the x axis, the folding portions 31A, 31B that are each formed by the joint main body 32 and the rotary member 33, and the cover member 34 that is provided on the bending portion 31A. As shown in FIG. 5, joint shafts 32a to which the pipes 22B are connected are provided on the joint main body 32 so as to project from a base portion 32b to plus sides and minus sides in the direction of the y axis and the direction of the z axis.

The joint shafts 32a are each formed into a substantially cylindrical shape. Two parallel long cutout portions 32a1 are formed on an outer circumferential surface of each of the joint shafts 32a. A locking projection 32a2 is provided on the outer circumferential surface between the two cutout portions 32a1. Then, two similar cutout portions 32a1 are also formed on an opposite side of the outer circumferential surface of each joint shaft 32a.

The joint main body 32 is formed entirely from a resin material through injection molding. Consequently, the outer circumferential surface that supports the locking projections 32a2 has elasticity. On the other hand, locking holes 220 where the locking projections 32a2 are locked are provided at four locations that are aligned at equal intervals in a circumferential direction on the outer circumferential wall at both end portions of each pipe 22B (refer to FIGS. 3 and 4). Similarly, locking holes 220 are provided at four locations that are aligned at equal intervals in a circumferential direction on an outer circumferential surface of each pipe 22A.

Consequently, when the pipe 22B is inserted into the joint shaft 32a, the locking projections 32a2 sink towards a radial center of the joint shaft 32a. Then, when the locking projections 32a2 come into alignment in position with the locking holes 220, the locking projections 32a2 are sprung back to thereby be locked into the locking holes 220, whereupon the insertion of the pipe 22B ends. It is noted that the locking projections 32a2 are formed so as to be lowered gradually towards the outer circumferential surface of the joint shaft 32a. This facilitates the insertion of the pipe 22B.

In the joint shafts 32a that lie coaxially via the joint main body 32, holes that are defined by inner surfaces of the cylindrical portions thereof open to each other to thereby establish a communication therebetween. Consequently, the holes defined by the inner surfaces of the cylindrical portions of the two joint shafts 32a that are joined in the direction of the y axis and the two joint shafts 32a that are joined in the direction of the z axis intersect each other in an interior of the base portion 32b.

Further, a circular ring portion 32a3 is formed at a base portion 32b side of the joint shaft 32a, and this circular ring portion 32a3 has a greater diameter than that of the cylindrically shaped portion of the joint shaft 32a. An outer circumferential surface of the circular ring portion 32a3 is formed so as to represent a surface that continues to the outer circumferential surface of the pipe 22B when the pipe 22B is slid on to the joint shaft 32a for connection.

Flat plate portions 32c are formed at the base portion 32b of the joint main body 32 so as to project individually therefrom towards the plus side and minus side of the x axis. Here, both the flat plate portions have the same shape. The flat plate portion 32c is formed substantially into a flat plate whose flat surface portions are oriented in the direction of the z axis. Four recess portions 32c1 are formed on each of the flat surfaces of the flat plate portion 32c as so-called thickness reduced portions.

A through hole 32c2 is formed in a substantially central position on the surface of the flat plate portion 32c. A pin member is inserted into the through hole 32c2 and a through hole 33b1 (refer to FIGS. 6A and 6B) formed in the rotary member 33. Consequently, the rotary member 33 is supported rotatably by the flat plate portion 32c.

A projecting end portion 32c3 of the flat plate portion 32c has a convexly projecting arc shape, and a rotation restricting projection 32c4 is formed at one terminal end portion of the convexly projecting arc-shape end portion 32c3. A side surface of the rotation restricting projection 32c4 continues to a side surface of the flat plate portion 32c. Then, a surface on a side of the rotation restricting projection 32c4 that lies to face the projecting end portion 32c3 is parallel to a side surface of the rotation restricting projection 32c4. As has been described above, since the flat plate portions 32c have the same shape, the rotation restricting projection 32c4 lying on a near side in FIG. 5 is formed at an end portion of the projecting end portion 32c3 on the plus side of the x axis, while the rotation restricting projection 32c4 on a far side in FIG. 5 is formed at an end portion of the projecting end portion 32c3 on the minus side of the x axis.

Figure 6A:
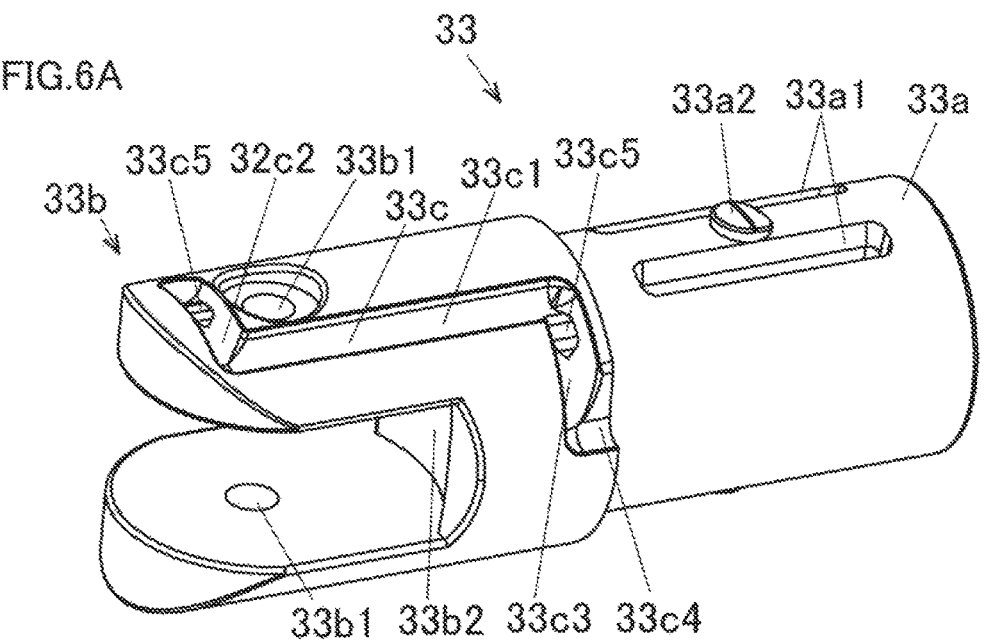
FIGS. 6A-B show a rotary member according to the embodiment of the invention.
Figure 6B:
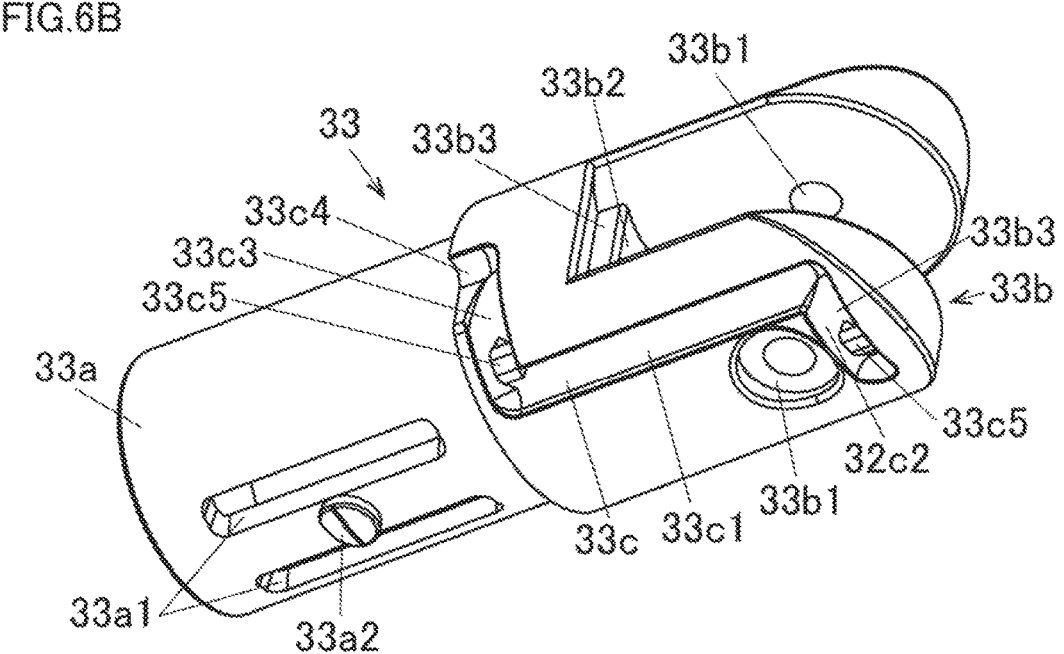

Next, the rotary member 33 will be described based on FIGS. 6A and 6B. FIG. 6A is a perspective view of the rotary member 33 as seen from thereabove, and FIG. 6B is a perspective view of the rotary member 33 as seen from therebelow. The rotary member 33 is formed from a resin material through injection molding and has a short rod shape. One end side of the rotary member 33 is formed into a cylindrical joint shaft 33a, and the pipe 22A is slid on to the cylindrical joint shaft 33a. Two parallel cutout portions 33a1 and a locking projection 33a2 are formed on a cylindrical outer wall of the joint shaft 33a. Two parallel cutout portions 33a1 and a locking projection 33a2 are also formed on an opposite side of the cylindrical outer circumferential surface of the cylindrical joint shaft 33a. Thus, the sets of two parallel cutout portions 33a1 and one locking projection 33a2 are formed at two locations on the outer circumferential surface of the joint shaft 33a. An operation performed in sliding the pipe 22A on to the joint shaft 33a will be similar to the operation performed in relation to the joint shaft 33a of the joint main body 32 and the cutout portions 32a1 and the locking projections 32a2 of the joint shaft 33a.

The other end side of the rotary member 33 is formed into a bifurcate portion 33b. A vertical section of an outer circumferential surface of the bifurcate portion 33b has an arc shape. The outer circumferential surface of the bifurcate portion 33b is formed so as to be level with the outer circumferential surface of the pipe 22A when the pipe 22A is connected to the rotary member 33. A distal end portion of the bifurcate portion 33b has a convexly projecting arc shape when seen from thereabove. Consequently, the distal end portion of the bifurcate portion 33b is prevented from interfering with a proximal end portion of the flat plate portion 32c (refer to FIG. 5) when the rotary member 33 is folded up.

An outer circumferential surface of the bifurcate portion 33b is bored at a substantially central portion so as to provide the through hole 33b1. The flat plate portion 32c of the joint main body 32 (refer to FIG. 5) is connected the bifurcate portion 33b as a result of the flat plate portion 32c being inserted into the bifurcate portion 33b so as to be held therebetween. Then, as has been described before, the pin member is inserted into the through hole 33b1 and the through hole 32c2 in the flat plate portion 32c, whereby the rotary member 33 is supported on the flat plate portion 32c so as to rotate freely.

When the bifurcate portion 33b of the rotary member 33 is connected to the flat plate portion 32c of the joint main body 32, a surface 33b2 of the bifurcate portion 33b that lies between two fork portions of the bifurcate portion 33b comes to face the projecting end portion 32c3 of the flat plate portion 32c in a deployed state. Then, the surface 33b2 of the bifurcate portion 33b that lies between the two fork portions follows the projecting end portion 32c3 of the flat plate portion 32c and has a concavely depressed arc shape when seen from thereabove. Further, as shown in FIG. 8, too, an abutment portion 33b3 is provided on the surface 33b2 at one end portion thereof, and this abutment portion 33b3 is formed into a step that falls from the end portion (refer to FIG. 6B).

Recessed groove-like guide grooves 33c are provided at two locations on an external surface of the bifurcate portion 33b. The guide grooves 33c are disposed in position where the guide grooves 33c do not interfere with the through holes 33b1. The guide groove 33c is made up of a longitudinal guide groove 33c1, a one directional guide groove 33c2 and the other directional guide groove 33c3. The longitudinal guide groove 33c1 is formed parallel to an axis of the rotary member 33. The one directional guide groove 33c2 is provided at a front end of the longitudinal guide groove 33c1 so as to extend therefrom in a circumferential direction about the axis. The other directional guide groove 33c3 is provided at a rear end of the longitudinal guide groove 33c1 so as to extend therefrom in the other circumferential direction about the axis. Then, an opening portion 33c4 is formed in the other directional guide groove 33c3 so as to open towards the joint shaft 33a. Further, a ride-over projecting portion 33c5 is formed on each of the one directional guide groove 33c2 and the other directional guide groove 33c3.

Figure 7A:
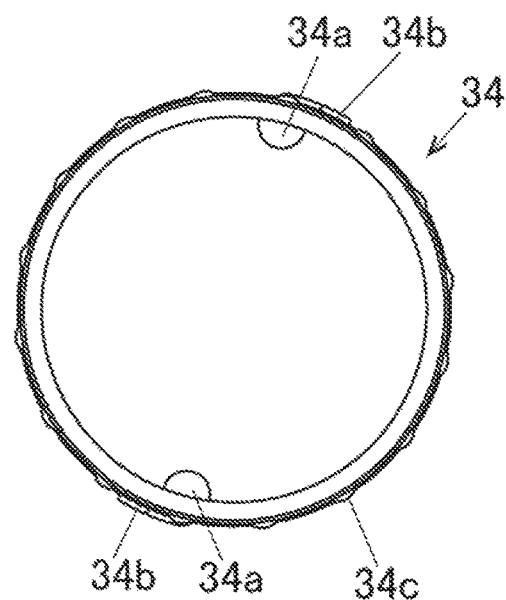
FIGS. 7A-B show a cover member according to the embodiment of the invention.
Figure 7B:
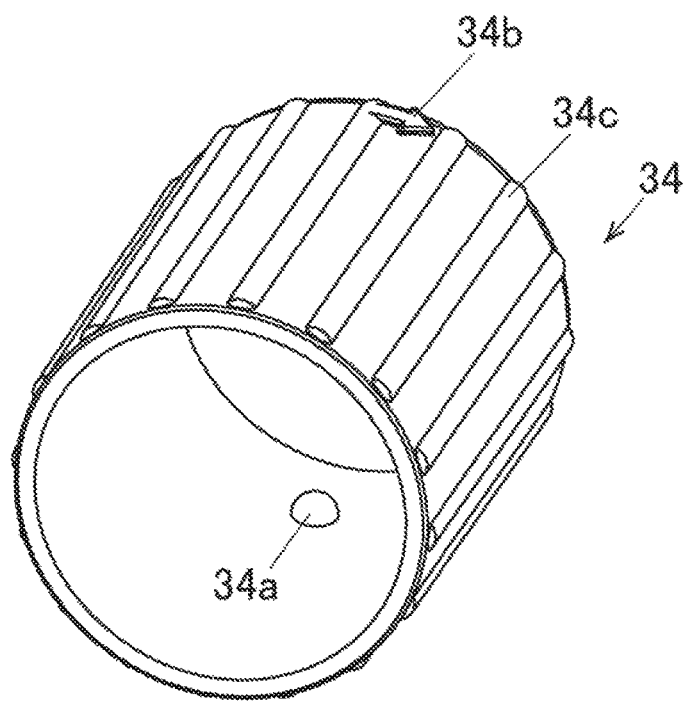

Next, the cover member 34 will be described based on FIGS. 7A and 7B. The cover member 34 has the cylindrical shape. Engaging projections 34a are formed on an inner circumferential surface of the cover member 34 so as to lie diametrically opposite to each other. The engaging projections 34a are individually brought into engagement with the guide grooves 33c. Arrow portions 34b are formed on an outer circumferential surface of the cover member 34 so as to correspond to the engaging projections 34a on the inner circumferential surface. The arrow portions 34b indicate a direction in which the cover member 34 should be rotated to lock the rotation thereof. A plurality of slide preventive projections 34c each taking the form of an elongated projection are formed on the outer circumferential surface of the cover member 34 so as to be parallel to the axis of the cover member 34.

Figure 8:
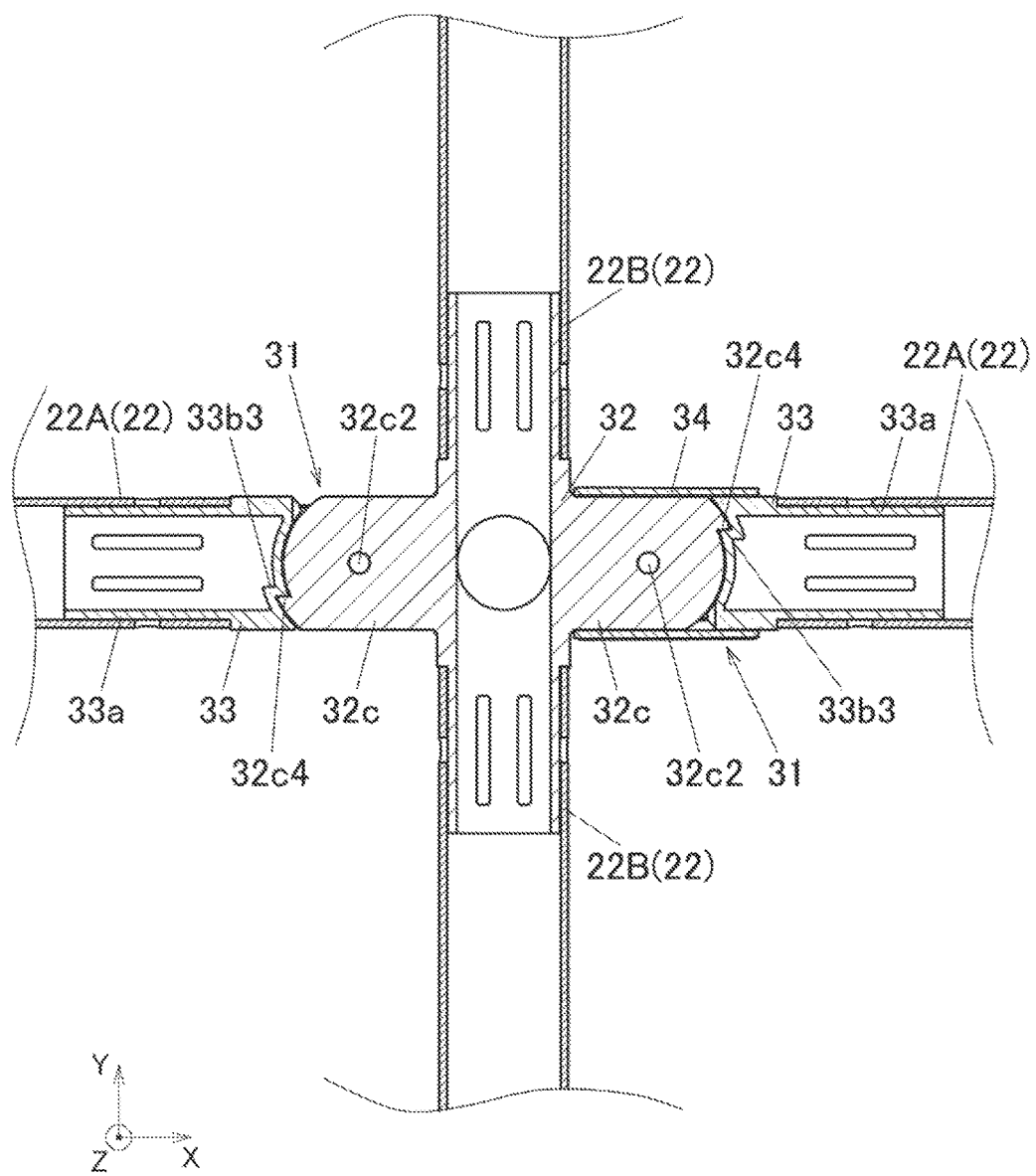
FIG. 8 is a horizontal sectional view of a main part of the jungle gym joint and the pipes that are connected thereto according to the embodiment of the invention, taken along a line VIII-VIII in FIG. 3

FIG. 8 shows a state in which the joint main body 32, the rotary members 33, the cover member and the pipes 22A, 22B are built up together. FIG. 8 shows a state in which the pipes 22A, 22B are deployed. In the deployed state of the pipes 22A, 22B, the abutment portions 33b3 of the rotary members 33 are in abutment with the rotation restricting projections 32c4 of the flat plate portions 32c of the joint main body 32. Then, in the folding portions 31, the rotary members 33 are rotated about the through holes 32c2 (the through holes 33b1), and in FIG. 8, the rotary members 33 can be rotated clockwise through an angle of about 90 degrees.

Figure 9:
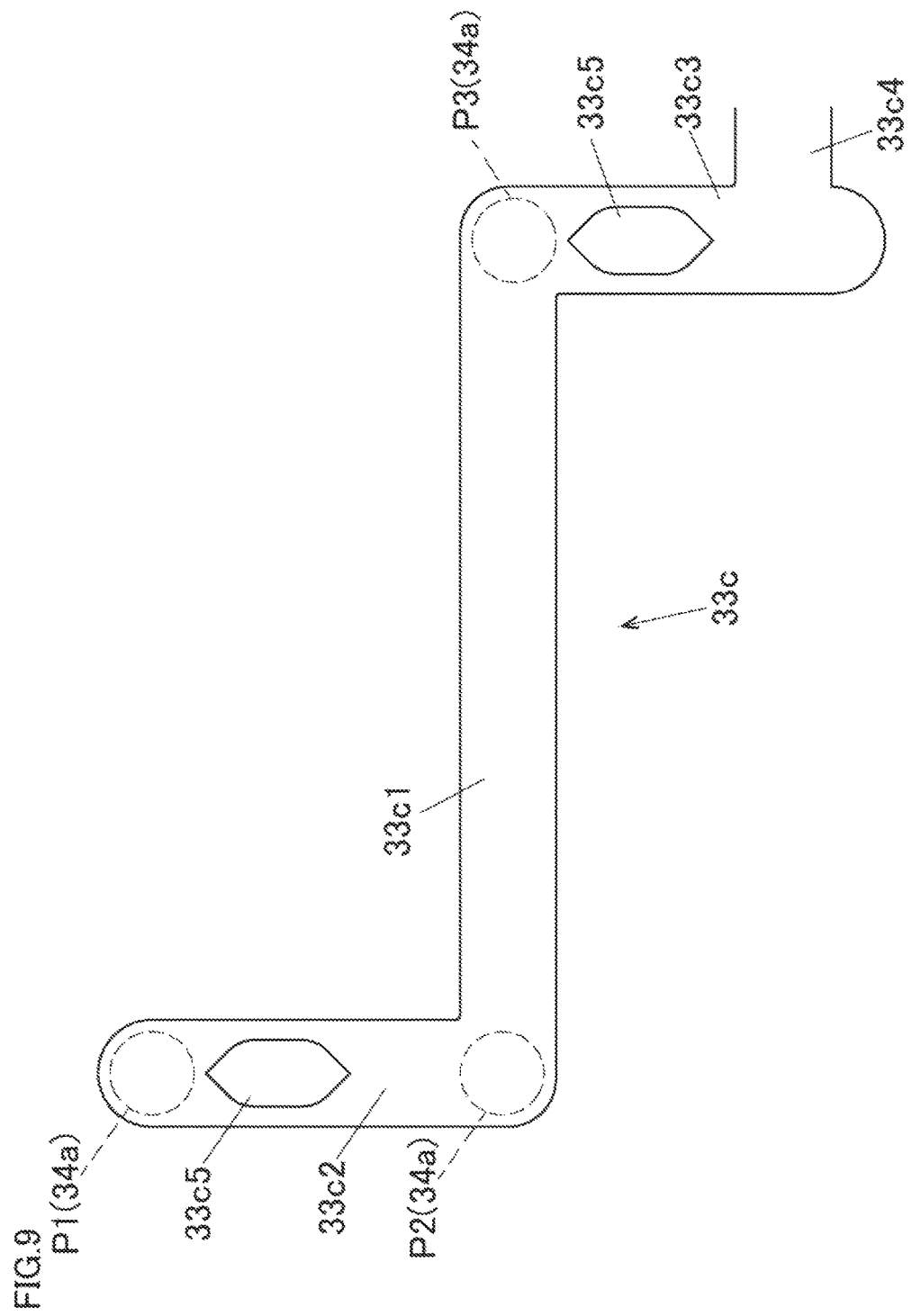
FIG. 9 is a schematic plan view showing an engagement of a guide groove with an engaging projection at a folding portion according to the embodiment of the invention.

Additionally, as shown schematically in FIG. 9, the engaging projections 34a of the cover member 34 are brought into engagement with the guide grooves 33c of the rotary member 33 at the folding portion 31. Namely, as a result of the engaging projections 34a being brought into engagement with the longitudinal guide grooves 33c1, the cover member 34 is guided so as to move freely back and forth. In addition, as a result of the engaging projection 34a being brought into engagement with the one directional guide groove 33c2, the cover member 34 is guided so as to rotate freely in one circumferential direction about the axis thereof. Then, as a result of the engaging projection 34a being brought into engagement with the other directional guide groove 33c3, the cover member 34 is guided so as to rotate freely in the other circumferential direction about the axis thereof.

The folding portion 31 is restricted from being folded by the cover member 34 as will be described below, and the restriction of folding of the folding portion 31 by the cover member 34 is released as will be described below. In the deployed state shown in FIGS. 1 to 3, the engaging projection 34a of the cover member 34 is situated at one end portion P1 of the one direction guide groove 33c2, as shown in FIG. 9, and the cover member 34 is situated in an advanced end position. As this occurs, as shown in FIG. 8, the flat plate portion 32c is in abutment with the inner circumferential surface of the cover member 34, the bending portion 31 is restricted from being folded.

Returning to FIG. 9, in order to allow the folding portion 31 to be folded, the cover member 34 is rotated in a direction indicated by an arrow Q1 in FIG. 3 (that is, in a direction towards the other end portion of the one directional guide groove 33c2), so that the engaging projection 34a is moved from the position P1 to a position P2 at the other end portion of the one directional guide groove 33c2 (in other words, a front end portion of the longitudinal guide groove 33c1) in FIG. 9. As this occurs, the engaging projection 34a rides over the ride-over projecting portion 33c5. Consequently, the cover member 34 is not rotated unless the engaging projection 34a rives over the ride-over projecting portion 33c5 on the one directional guide groove 33c2, and therefore, an abrupt and unintentional rotation of the cover member 34 is prevented. Then, the user can recognize that the restriction of rotation of the cover member 34 is released by feeling a sensation of clicking that is produced when the engaging projection 34a rides over the ride-over projecting portion 33c5 on the one directional guide groove 33c2.

Figure 10:
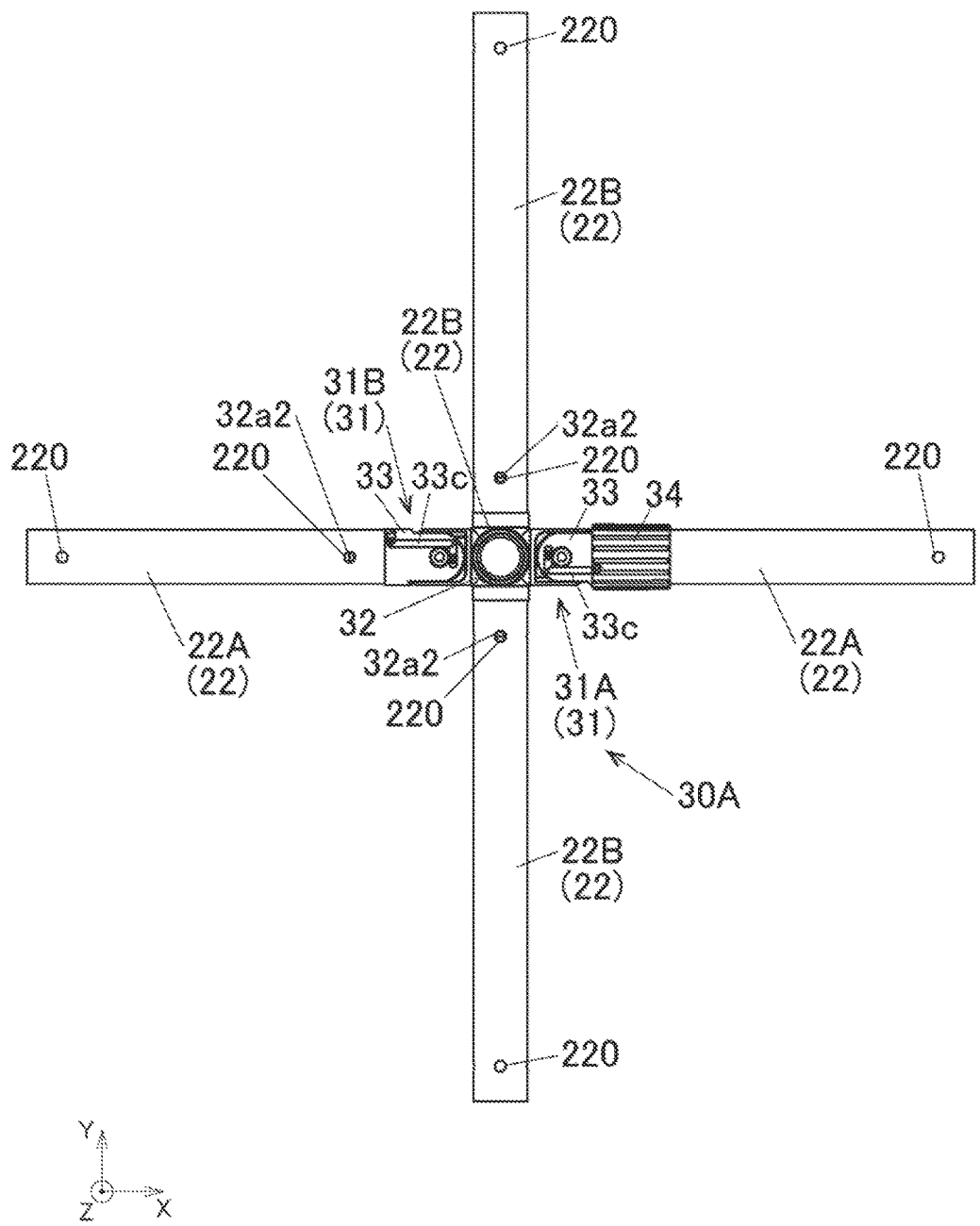
FIG. 10 is a top view of the jungle gym joint and the pipes that are connected thereto according to the embodiment of the invention, showing a state in which the cover member is moved.
Figure 11:
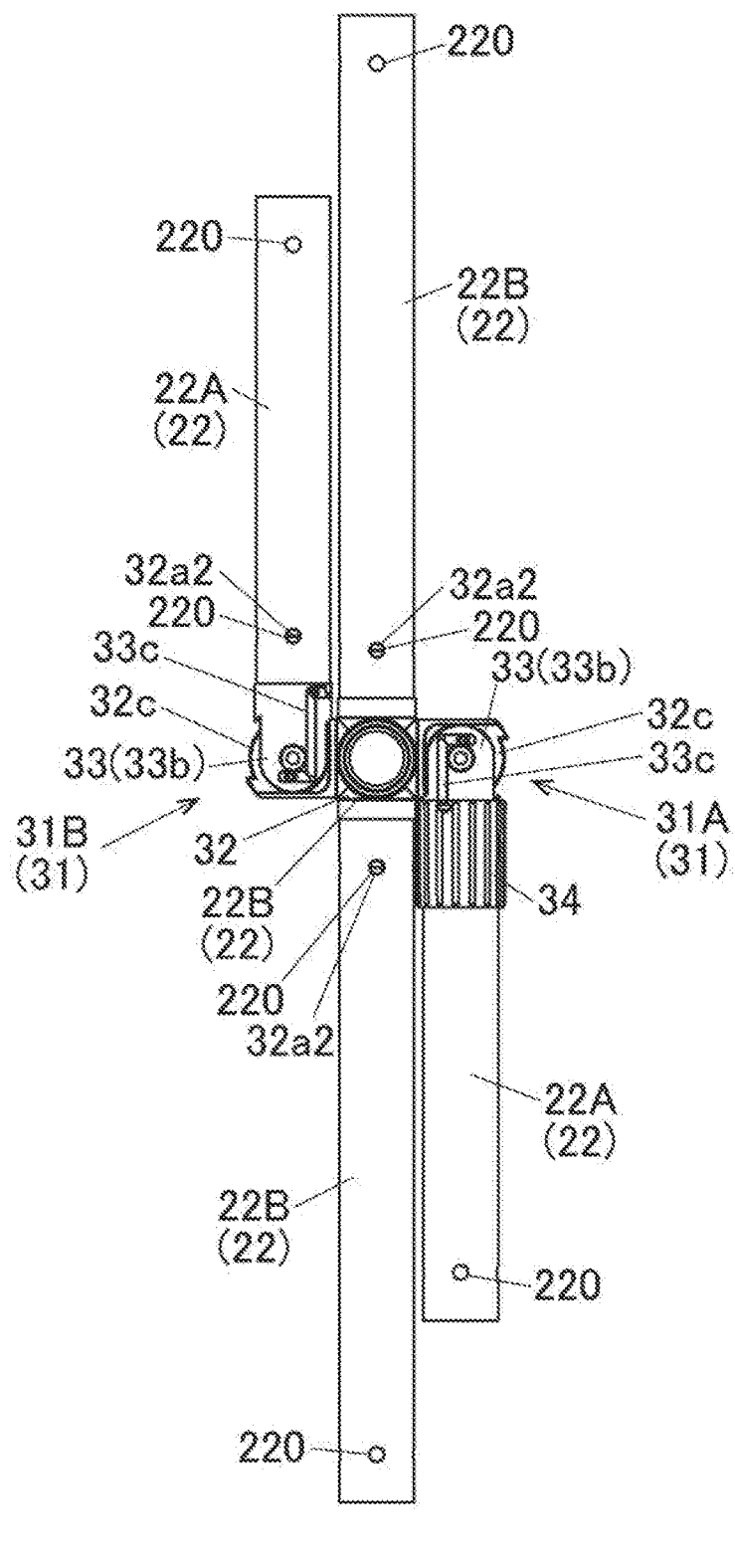
FIG. 11 is a top view of the jungle gym joint and the pipes that are connected thereto according to the embodiment of the invention, showing a state in which the pipes are folded.

Next, the cover member 34 is moved in a direction indicated by an arrow Q2 so that the cover member 34 is moved from the position P2 to a position P3 at a rear end portion of the longitudinal guide groove 33c1 (in other words, one end portion of the other directional guide groove 33c3) in FIG. 9. A state into which the cover member 34 is put when it is so moved is shown in FIG. 10. In the state shown in FIG. 10, the cover member 34 is situated in a withdrawal end position, and the inner circumferential surface of the cover member 34 is not in abutment with the flat plate portion 32c. Therefore, the folding portion 31 is allowed to be folded. Then, when the folding portion 31 is folded, a state shown in FIG. 11 occurs.

Rotating the cover member 34 in the other direction causes the engaging projecting portion 34a to ride over the ride-over projecting portion 33c5. Then, the engaging projection 34a can leave the guide groove 33c (the other directional guide groove 33c3) via the opening portion 33c4. In this way, the cover member 34 can be removed from the joint main body 32. Namely, the cover member 34 is not easily rotated with the engaging projection 34a staying in the position P3. Then, when the engaging projection 34a is rotated further from the position P3 to the other end portion of the other directional guide groove 33c3, the user can sense that the cover member 34 is being allowed to be removed from the joint main body 32 by feeling a sensation of clicking that is produced when the engaging projection 34a rides over the ride-over projecting portion 33c5 on the other directional guide groove 33c3.

In such a state that the pipe 22A is connected to the joint shaft 33a of the rotary member 33, even though the engaging projection 34a is situated in the opening portion 33c4, since an end face of the pipe 22A is in abutment with the engaging projection 34a, the cover member 34 cannot easily be removed from the folding portion 31.

Figure 12:
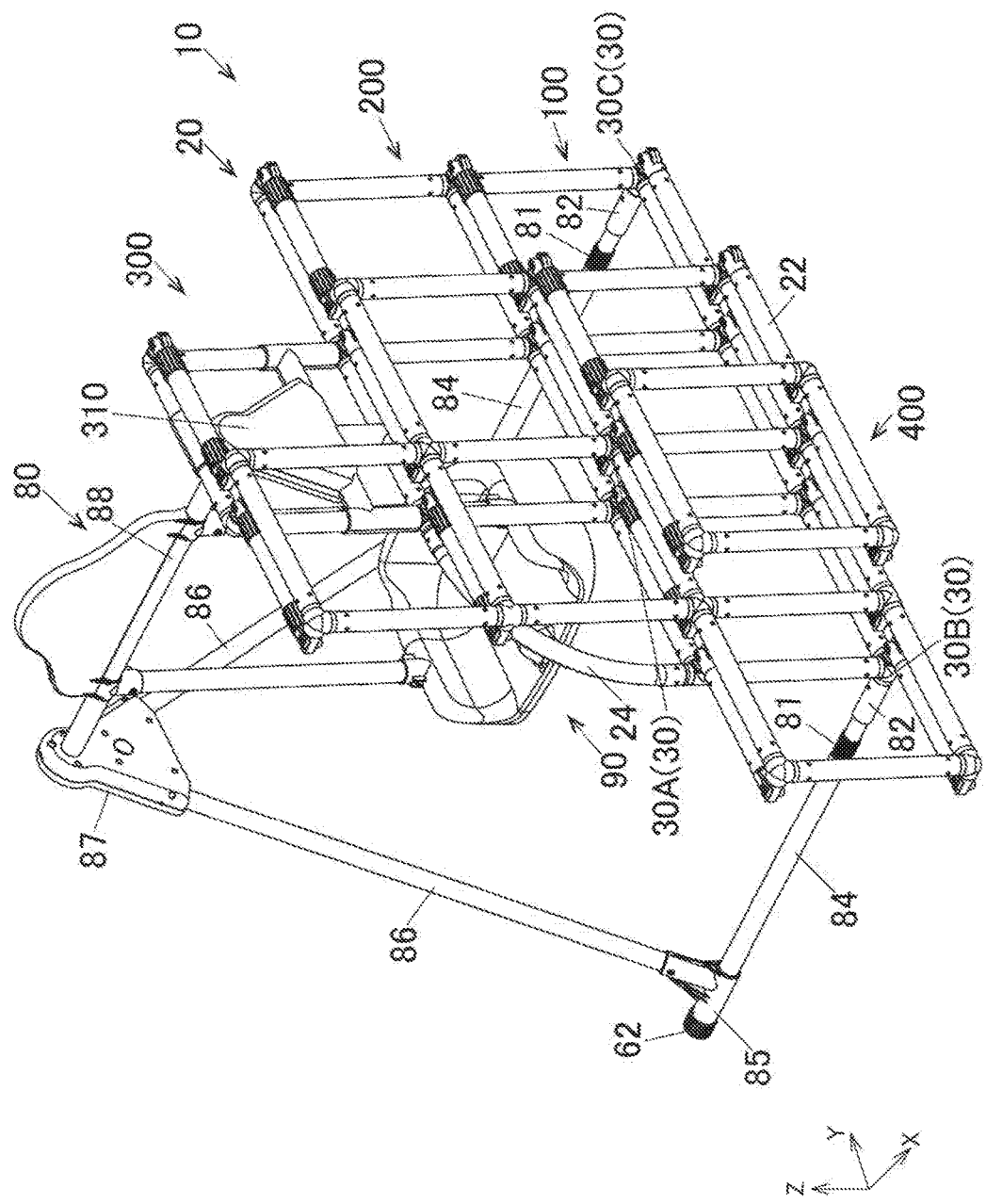
FIG. 12 is a perspective view of the jungle gym according to the embodiment of the invention as seen from the jungle gym portion side, showing a state in which the jungle gym portion is folded up.
Figure 13:
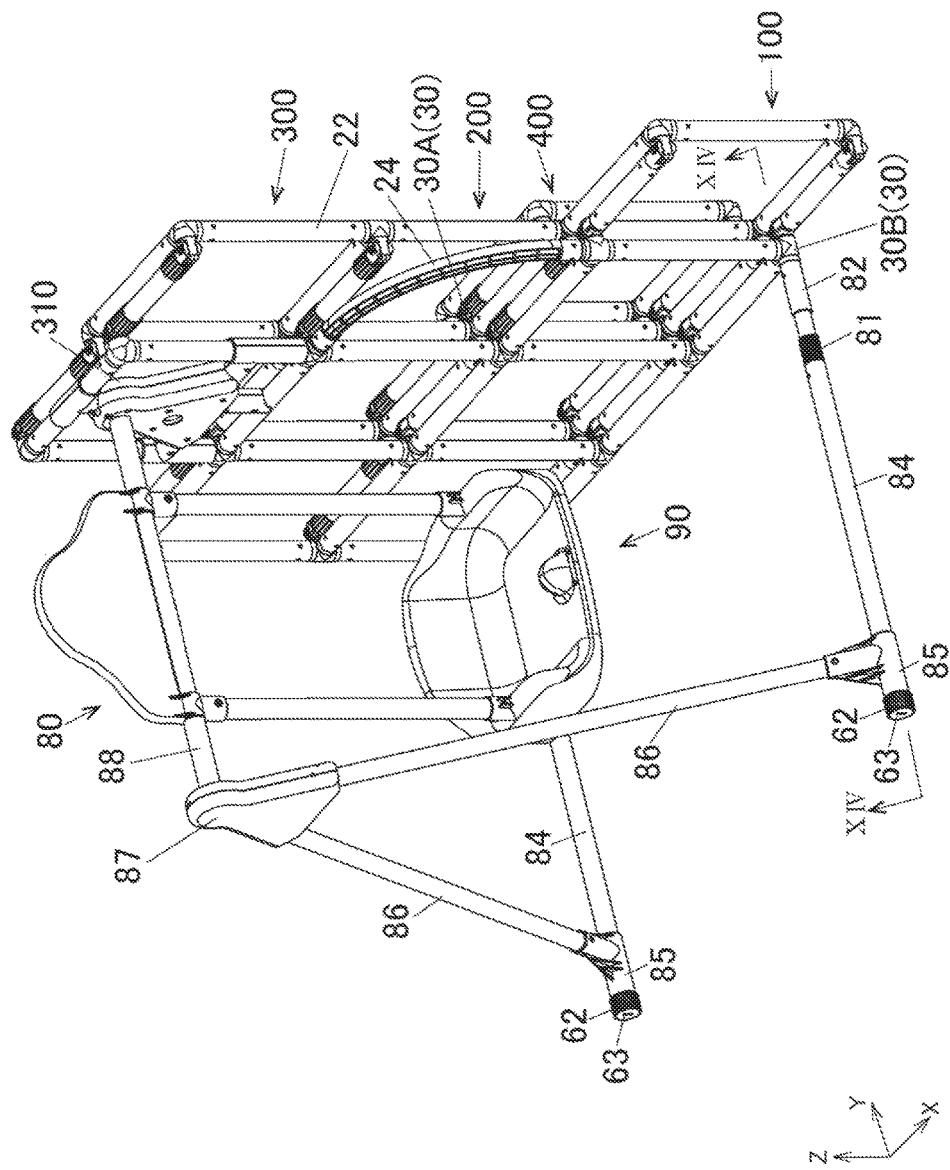
FIG. 13 is a perspective view of the jungle gym according to the embodiment of the invention as seen from the swing portion side, showing the state in which the jungle gym portion is folded up.

The folding portions 31 of the jungle gym joints 30 of the jungle gym section 20 can be folded through the angle of 90 degrees. Here, the folding portions 31 of the jungle gym joints 30 are all disposed in the direction of the x axis. Then, the folding portions 31 are allowed to be folded through the angle of 90 degrees. Consequently, when folding up the jungle gym section 20, the slide 72, the ladder 74 and the platform 76 are removed from the jungle gym section 20 in advance, and the cover members 34 are operated to move in the way described above to release the restriction of folding of the folding portions 31, whereby the jungle gym section 20 can be folded up as shown in FIGS. 12 and 13.

When deploying the jungle gym section 20 from the stored state where the jungle gym section 20 is folded up, an opposite procedure to that described above should be followed. As this occurs, the user can recognize that the folding portion 31 is restricted from being folded by the engaging projections 34a on the cover member 34 riding over the ride-over projecting portion 33c5 on the one directional guide groove 33c2.

In case the cover member 34 is provided on at least one of the folding portions 31 of each of the solid frames 25 that are arranged on a plane parallel to the folding direction (a y-z plane in this embodiment) in the jungle gym section 20, the folding portions 31 of the solid frames 25 on the plane parallel to the folding direction can be restricted from being folded. However, incase the cover members 34 are provided on the plurality of folding portions 31 of the portions of the jungle gym section 20 to which a relatively great force is applied when an infant plays with the jungle gym section 20, the rigidity can preferably be enhanced which resists against the force applied to the jungle gym section 20 in the folding direction when the infant plays with the jungle gym section 20.

In this way, the cover member 34 is guided back and forth by the longitudinal guide grooves 33c1 and the engaging projections 34a, and therefore, the jungle gym 20 can be deployed from the stored state and folded up for storage in a short stroke. Then, in such a state that the jungle gym section 20 is deployed for use, the cover member 34 is kept from being rotated to move back and forth by the one directional guide groove 33c2.

Next, the swing section 80 will be described. As shown in FIGS. 12 and 13, the swing section 80 is disposed on a minus side of the jungle gym section 20 in relation to the direction of the x axis. Swing support base pipes 84 are connected to the swing section 80 via the jungle gym joints 30B, 30C that lie at two locations on a setting plane and connecting pipes 82 that are formed short in length. Connection support members 85 are provided individually at minus end portions of the swing support base pipes 84 in relation to the direction of the x axis. Then, swing support vertical pipes 86 are provided individually so as to extend upwards from the swing support base pipes 84 via the connection support members 85. The swing support vertical pipes 86 extend upwards in an inclined fashion. The swing support vertical pipes 86 are connected to each other in such a way that extensions of the swing support vertical pipes 86 intersect each other at an intersecting portion connecting member 87 at an intersecting portion lying upwards thereof.

On the other hand, a fixing member 310 is fixed to the inside of a lattice plane of the top frame 300 at the uppermost stage of the jungle gym section 20 which lies on a minus side of the top frame 300 in relation to the direction of the x axis. A swing support horizontal pipe 88 is provided to span horizontally between the intersecting portion connecting member 87 and the fixing member 310 and is supported at both ends thereof by those members. Pin members that are inserted through the intersecting portion connecting member 87 and the fixing member 310 are brought into engagement with both end portions of the swing support horizontal pipe 88, whereby the swing support horizontal pipe 88 is restricted from rotating about an axis thereof. Then, the swing 90 is provided on the swing support horizontal pipe 88 so as to swing freely relative to the swing support horizontal pipe 88.

Figure 14:
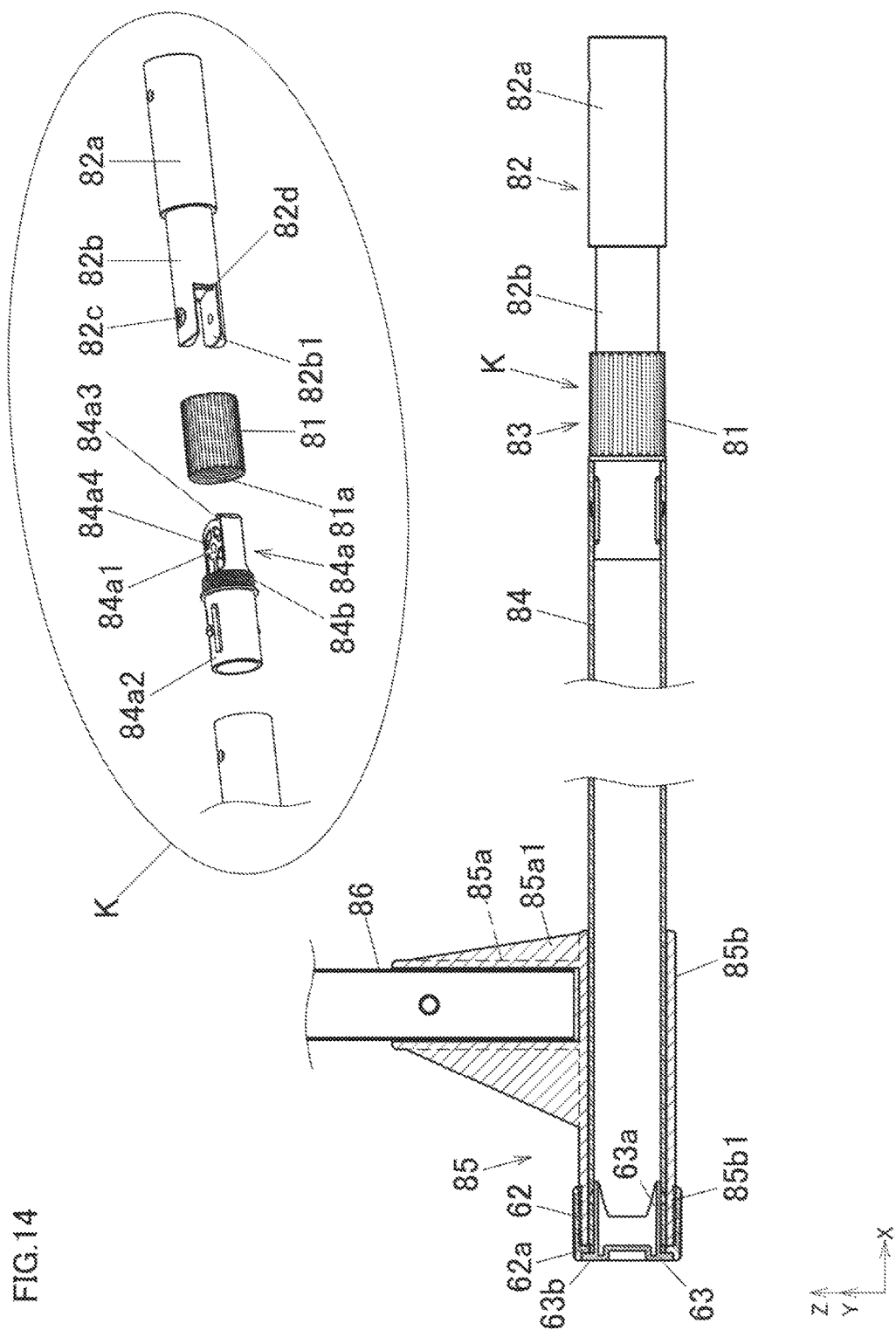
FIG. 14 is a sectional view of a main part of the jungle gym according to the embodiment of the invention taken along a line XIV-XIV in FIG. 13.
Figure 15:
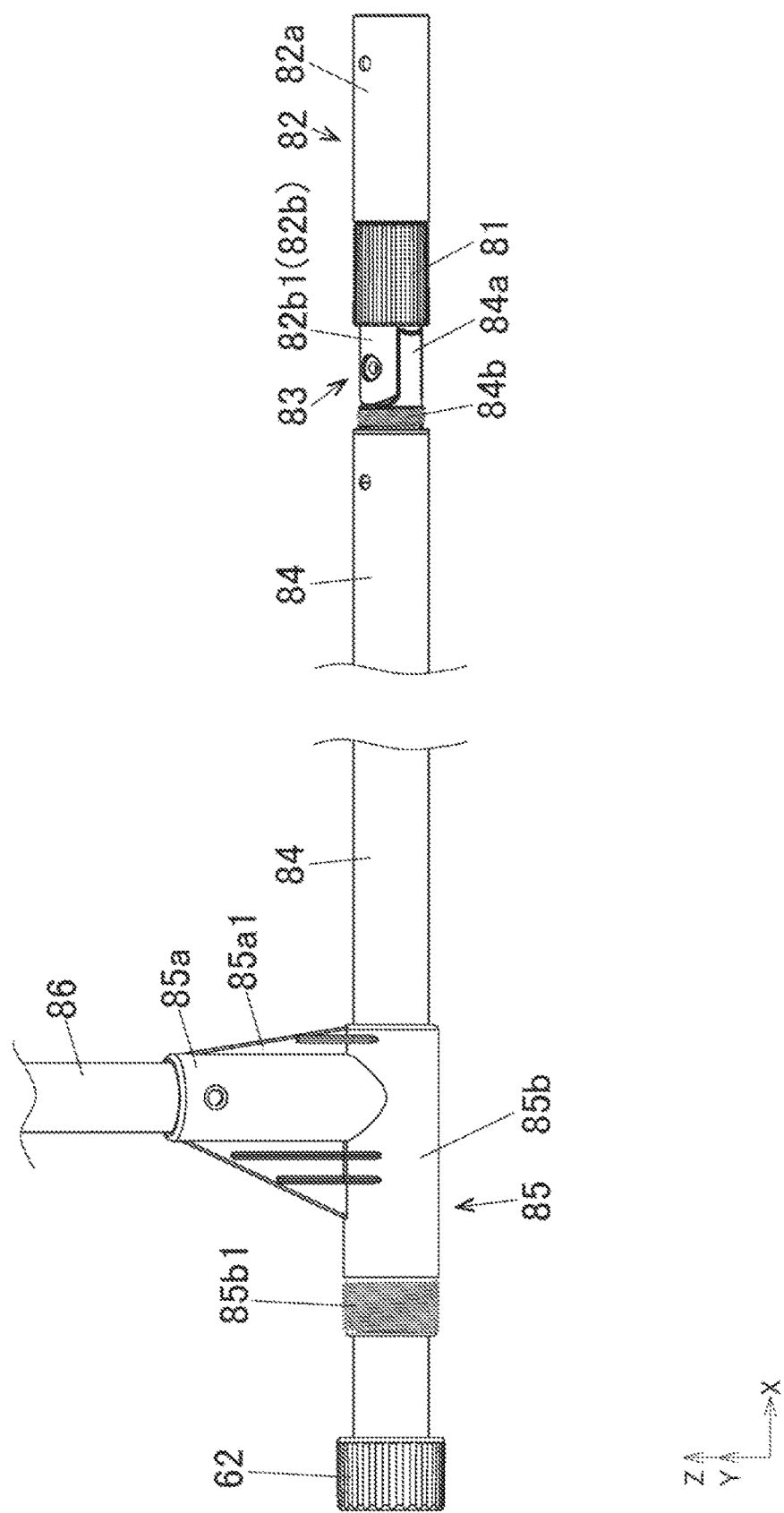
FIG. 15 is a perspective view of a main part of the jungle gym according to the embodiment of the invention, showing a connecting state between a swing support base pips with peripheral parts.

FIGS. 14 and 15 show the swing support base pipe 84 and members that are provided on the periphery of the swing support base pipe 84. FIGS. 14 and 15 show the swing support base pipe 84 that is connected to the jungle gym joint 30B shown on a near side of FIG. 13 and the members provided on the periphery of the swing support base pipe 84, however, the swing support base pipe 84 that is connected to the jungle gym joint 30C on a far side of FIG. 13 and the members provided on the periphery of the swing support base pipe 84 are constructed similarly to those on the near side.

As shown in FIGS. 14 and 15, a large diameter portion 82a having a cylindrical shape is formed so as to represent a portion of the connecting pipe 82 which lies to face the jungle gym joint 30B (in other words, a plus side portion of the connecting pipe 82 in relation to the direction of the x axis). A small diameter portion 82b whose outside diameter is smaller than that of the large diameter portion 82a is formed at a minus side of the large diameter portion 82a in relation to the direction of the x axis. The large diameter portion 82a and the small diameter portion 82b are formed integrally. As shown in an exploded perspective view of a portion denoted by a reference character K in FIG. 14, a bifurcate portion 82b1 is formed at a distal end of the small diameter portion 82b. This bifurcate portion 82b1 is formed similarly to the bifurcate portion 33b of the rotary member 33 of the jungle gym joint 30. Specifically speaking, a through hole 82c and an abutment portion 82d are formed.

Then, as shown in the exploded perspective view of the portion K of FIG. 14, a connecting member 84a is provided at an end portion of the swing support base pipe 84 which faces the connecting pipe 82. The connecting member 84a includes a flat plate portion 84a1 and a joint shaft 84a2. The joint shaft 84a2 of the connecting member 84a is inserted into an end portion of the swing support base pipe 84, and the flat plate portion 84a1 projects from the end portion of the swing support base pipe 84. This flat plate portion 84a1 is formed similarly to the flat plate portion 32c of the joint main body 32 of the jungle gym joint 30. Specifically speaking, a rotation restricting projection 84a3 and a through hole 84a4 are formed at an end portion of the flat plate portion 84a1 which has a convexly projecting arc shape when seen from thereabove. The connecting member 84a and the bifurcate portion 82b1 shown on the near side of FIG. 13 are provided symmetrical with the connecting member 84a and the bifurcate portion 82b1 shown on the far side of FIG. 13 with respect to the x axis.

The flat plate portion 84a1 and the bifurcate portion 82b1 are connected together rotatably by a pin member, not shown, being inserted through the through holes 82c, 84a4 as the flat plate portion 32c and the bifurcate portion 33b of the jungle gym joint 30 are done so, whereby a foldable switch support base folding portion 83 is formed. Then, an outward rotation is restricted by the rotation restricting projection 84a3 and the abutment portion 82d.

Namely, as shown in FIGS. 1, 2, 12 and 13, the two swing support base pipes 84 are restricted from rotating in a direction in which the swing support base pipes 84 rotate away from each other but are allowed to rotate in a direction in which the swing support base pipes 84 rotate towards each other when the swing support base pipes 84 continue to the corresponding connecting pipes 82 in a straight line.

Further, as shown in FIGS. 14 and 15, a thread portion 84b made up of external threads is formed at a proximal end portion the flat plate portion 84a1. Then, a swing support base cover 81 is provided on an outer circumference of the swing support base folding portion 83. A thread portion 81a (refer to the exploded perspective view showing the portion K in FIG. 14) made up of internal treads is formed on an inner circumferential surface of the swing support base cover member 81 for threading engagement with the thread portion 84b. Then, an outside diameter of the swing support base cover member 81 is formed substantially equal to outside diameters of the connecting pipes 82 and the swing support base pipes 84.

As shown in FIG. 14, when the thread portion 81a of the swing support base cover member 81 is in threading engagement with the thread portion 84b, the flat plate portion 84a1 is in abutment with the inner circumferential surface of the swing support base cover member 81. Therefore, the swing support base folding portion 83 is restricted from being folded. On the other hand, as shown in FIG. 15, in such a state that the threading engagement between the thread portion of the swing support base cover 81 and the thread portion 84b is released and that a plus side end portion of the swing support base cover member 81 in relation to the direction of the x axis is brought into abutment with a step portion formed by the small diameter portion 82b and the large diameter portion 82a, the flat plate portion 84a1 is not in abutment with the inner circumferential surface of the swing support base cover member 81, the restriction of folding of the swing support base folding portion 83 is released.

The connection support members 85 are provided individually at the minus end portions of the swing support base pipes 84 in relation to the direction of the x axis. A substantially cylindrical support portion 85a is formed on each of the connection support members 85 to support the corresponding swing support vertical pipe 86. The swing support vertical pipe 86 is inserted into the support portion 85a at a portion lying near the end portion so as to be supported therein.

A sliding cylindrical portion 85b is formed at a lower end of the support portion 85a. A multiplicity of ribs 85a1 are provided to connect an outer circumference of the support portion 85a and an outer circumference of the sliding cylindrical portion 85b together. This allows the swing support vertical support pipe 86 to be supported highly rigidly by the support portion 85a. The sliding cylindrical portion 85b is formed into a cylindrical shape that surrounds an outer circumference of the swing support base pipe 84. A thread portion 85b1 made up of external treads is formed at a minus end portion of the sliding cylindrical portion 85b in relation to the direction of the x axis.

A thread member 62 that has a substantially cylindrical shape and which includes an internal thread portion formed on an inner circumferential surface thereof is brought into threading engagement with the thread portion 85b1. On the other hand, a fastening member 63 is fixed to the minus end portion of the swing support base pipe 84 in relation to the direction of the x axis. The fastening member 63 includes a cylindrical inserting portion 63a that is inserted into the swing support base pipe 84 and a fastening plate portion 63b that has a flange shape. An annular plate portion 62a having a circular ring shape is formed on an inner circumferential surface of the thread member 62 so as to project therefrom, and this annular plate portion 62a is positioned so as be held by an end portion of the sliding cylindrical portion 85b and a portion of the fastening plate portion 63b of the fastening member 63 that lies near an outer circumferential edge thereof therebetween. This allows the thread member 62 to rotate freely about an axis of the thread member 62 but restricts the thread member 62 from moving an axial direction thereof.

Figure 16:
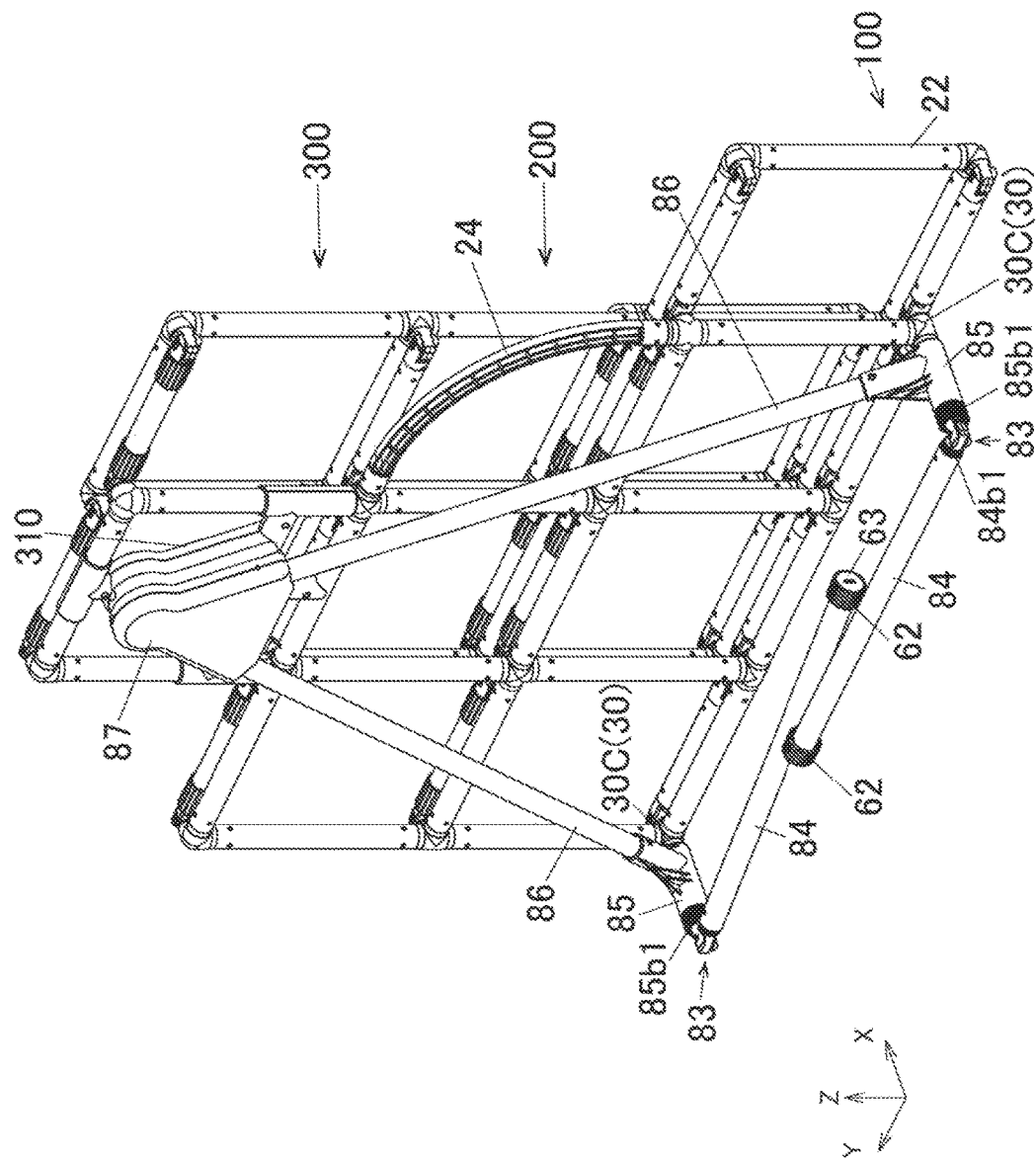
FIG. 16 is a perspective view of the jungle gym according to the embodiment of the invention as seen from the swing portion side, showing a state in which the jungle gym is folded up.

The storage of the swing portion 80 will be performed as follows. Firstly, the swing section 90 and the swing support horizontal pipe 88 are removed in advance. In addition, the two thread members 62 are rotated to release the threading engagement thereof with the corresponding thread portions 85b1 of the sliding cylindrical portions 85b. Then, the sliding cylindrical portions 85b are allowed to move freely in the direction of the x axis along the swing support base pipes 84. Next, as shown in FIG. 15, the threading engagement of the swing support base cover members 81 with the thread portions 84b is released. Then, the swing support base cover members 81 are moved to a position where the swing support base cover members 81 are brought into abutment with the step portions that are formed by the large diameter portions 82a and the small diameter portions 82b of the connecting pipes 82. Thereafter, the connecting support members 85 are moved to the positions of the connecting pipes 82, so that the two swing support base pipes 84 are folded so as to face each other, whereby the swing section 80 can be put into a stored state shown in FIG. 16.

In this way, the swing section 80 can be put into the stored state easily and simply by folding up the swing support base pipes 84 that extend in the direction of the x axis. Consequently, the jungle gym 10 including the jungle gym section 20 and the swing section 80 can be put in a stored state easily and simply.

Figure 17:
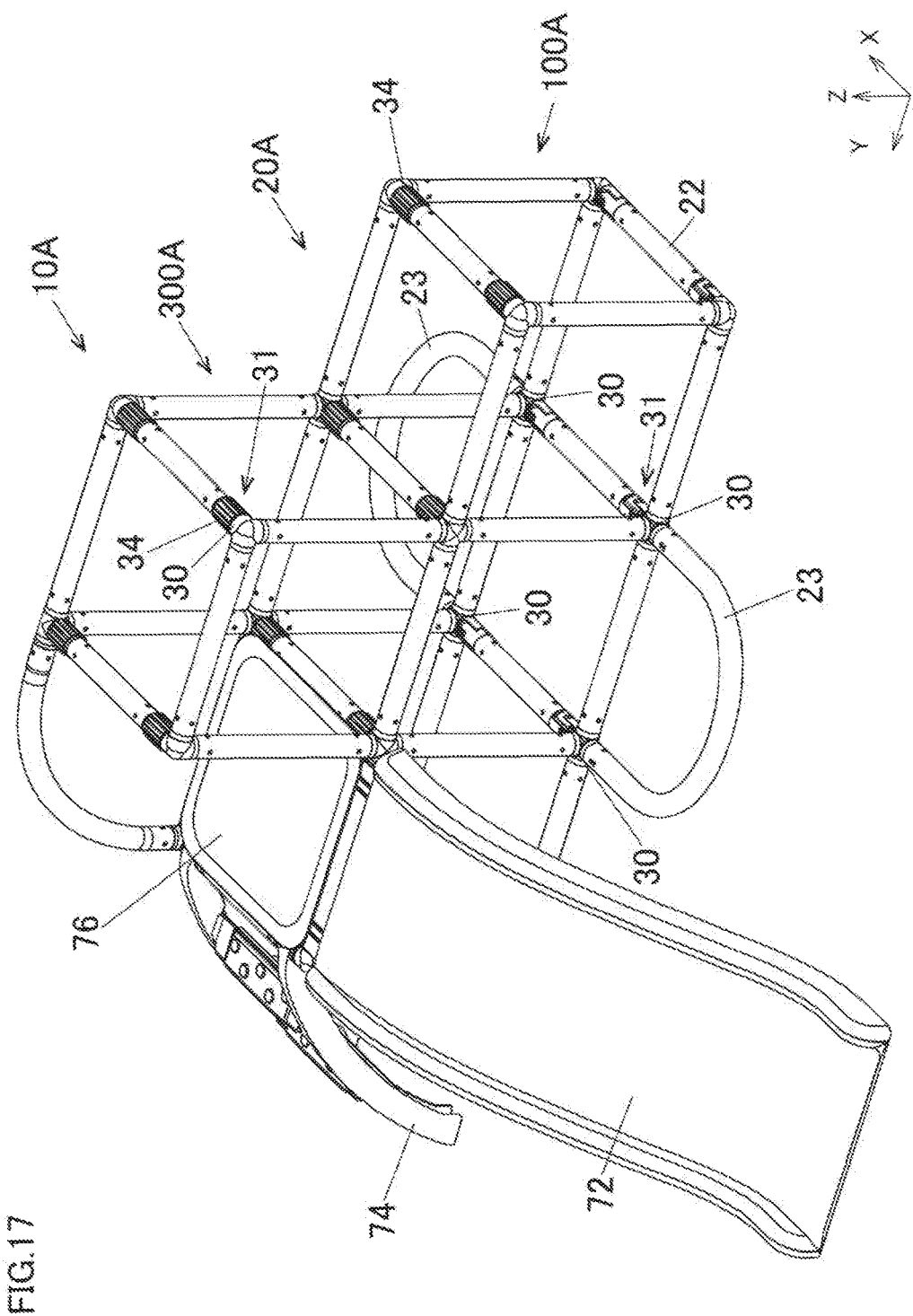
FIG. 17 is a perspective view showing a modified example of a jungle gym according to the embodiment of the invention.
Figure 18:
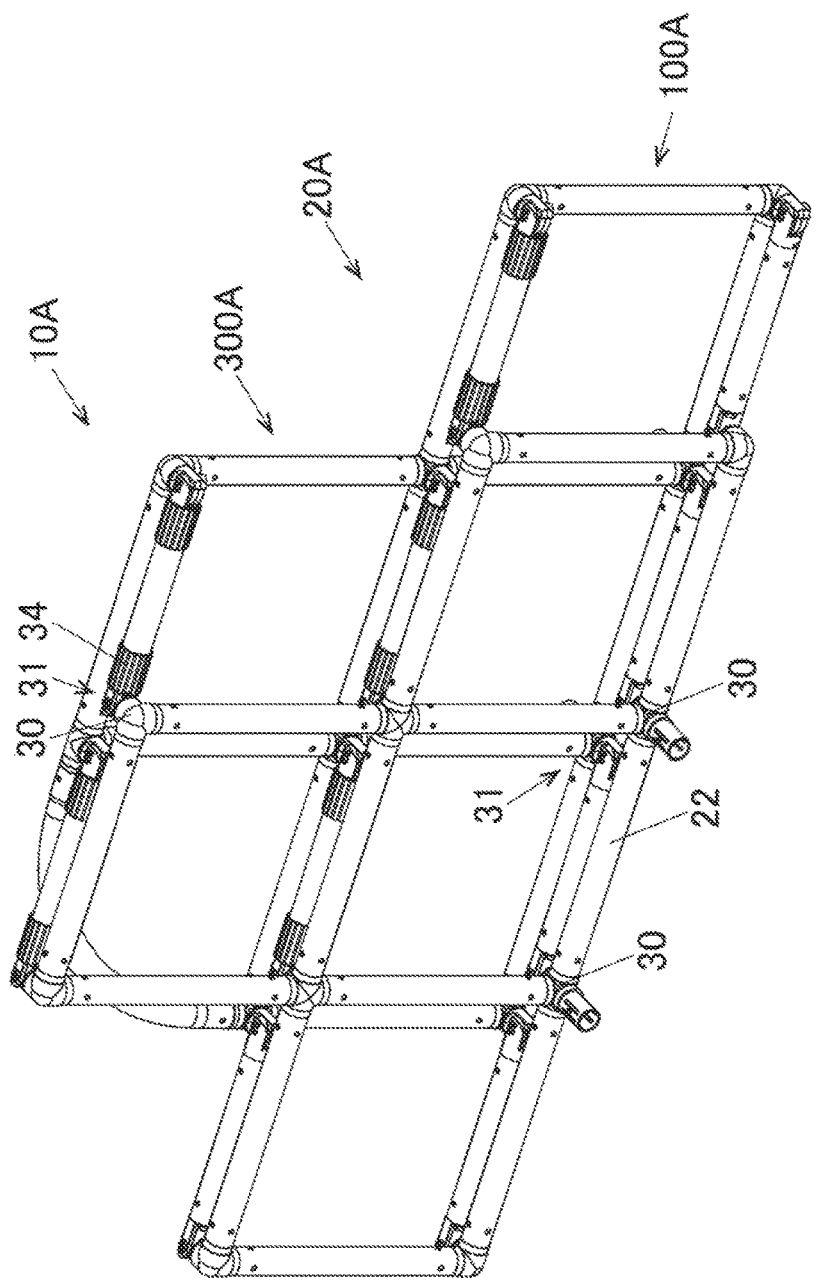
FIG. 18 is a perspective view showing the modified example of the jungle gym according to the embodiment of the invention, showing a state in which the jungle gym is folded up.

Next, as a modified example of the jungle gym 10 described above, a jungle gym 10A employing jungle gym joints 30 is shown in FIGS. 17 and 18. The jungle gym 10A does not include the swing section 80 but includes a jungle gym section 20A on which the slide 72, the ladder 74 and the platform 76 are provided. The jungle gym section 20A is formed into two stages and includes a lowermost base frame group 100A and a central uppermost top frame 300A. Frame members 23 each made up of straight-line portions and a convexly projecting arc-shaped portion are connected individually to jungle gym joints 30 on a setting plane of a central solid frame 25 of the base frame group 100A. This allows the jungle gym 10A to be set on the setting plane in a more stable fashion.

In the jungle gym section 20A of the jungle gym 10A, 10 three-way branching jungle gym joints 30, 2 four-way branching jungle gym joints 30, 8 five-way branching jungle gym joints 30 and a plurality of pipes 22 form three solid frames 25 in the base frame group 100A and one solid frame 25 in the uppermost top frame.

When storing the jungle gym 10A that is formed in the way described above, the slide 72, the ladder 74, the platform 76 and the frame members 23 are removed, and cover members 34 that are provided partially on folding portions 31 of the jungle gym joints 30 are operated so as to release the restriction of folding of the folding portions 31. Then, when the folding portions 31 are folded, a state shown in FIG. 18 can be realized.

Thus, while the embodiment of the invention has been described heretofore, the invention is not limited to the embodiment but can be carried out in various forms. For example, the relationship between the bifurcate portion 33b of the rotary member 33 and the flat plate portion 32c of the joint main body 32 may be reversed, so that the flat plate portion is provided on the rotary member 33 and the bifurcate portion may be provided on the joint main body 32.

In addition, in the embodiment described above, while the pipes 22 are connected directly to the joint shafts 33a of the rotary members 33, the pipes 22 may be connected indirectly to the joint shafts 33a via spacers. Additionally, in this embodiment, while the folding portions 31 are formed so as to rotate freely through the angle of 90 degrees, the angle through which the folding portions are folded can be set arbitrarily.

Further, in this embodiment, while the folding portions 31 are folded in the direction parallel to the x-y plane, the folding portions 31 may be folded in a direction parallel to an x-z plane so that the jungle gym section 20 is wholly folded up in a vertical direction.

What is claimed is:
1. A jungle gym joint comprising:
a joint main body having joint shafts to which a plurality of pipes are respectively connected; and
a rotary member that is formed into a short rod shape and to one end of which a pipe is connected,
wherein a folding portion is formed at another end of the rotary member in which a flat plate portion is held in a bifurcate portion together with the joint main body so as to allow the pipe to be folded up,
wherein a cover member being cylindrically shaped comprises an engaging projection on an inner circumferential surface thereof, wherein the cover member is provided on an outer circumference of the folding portion, and
wherein the cover member is guided so as to move freely back and forth in an axial direction as a result of a guide groove provided on the folding portion being brought into engagement with the engaging projection in such a way that when the cover member is guided to an advanced end position, the cover member restricts the folding portion from being folded by a circumferential wall of the cover member being brought into abutment with the flat plate portion or the bifurcate portion, while when the cover member is in a withdrawal end position, the circumferential wall is not in abutment with the flat plate portion or the bifurcate portion, and the cover member releases the restriction of folding of the folding portion.

2. The jungle gym joint according to claim 1, wherein the guide groove comprises a first directional guide groove that guides the cover member so as to rotate in a first circumferential direction about an axis thereof when the cover member is in the advanced end position and a second directional guide groove that guides the cover member so as to rotate in a second circumferential direction about the axis thereof when the cover member is in the withdrawal end position.

3. The jungle gym joint according to claim 2, wherein the first directional guide groove and the second directional guide groove each include a ride-over projecting portion that is formed so that the engaging projection of the cover member can ride thereover.

4. The jungle gym joint according to claim 3, wherein the flat plate portion is formed on the joint main body, and the bifurcate portion is formed on the rotary member.

5. A jungle gym having a jungle gym section comprising the jungle gym joint according to claim 4, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon,
wherein the connection support members each comprise a support portion that supports the respective swing support vertical pipe and a sliding cylindrical portion that is fixed to a lower end of the support portion and which is formed on an outer circumference of the respective swing support base pipe,
wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

6. The jungle gym joint according to claim 3, wherein the flat plate portion is formed on the joint main body, and the bifurcate portion is formed on the rotary member, wherein a projecting end portion of the flat plate portion has a convexly projecting arc shape when seen from thereabove and includes a rotation restricting projection that is provided so as to project therefrom, and wherein a surface of the bifurcate portion that lies between two fork portions thereof and which faces the projecting end portion of the flat plate portion follows the projecting end portion of the flat plate portion to thereby be given a concavely depressed arc shape when seen from thereabove and includes an abutment portion that is provided thereon so as to be brought into abutment with the rotation restricting projection.

7. A jungle gym having a jungle gym section comprising the jungle gym joint according to claim 6, and a swing section that is connected adjacent to the jungle gym section, wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

8. A jungle gym having a jungle gym section comprising the jungle gym joint according to claim 3, and a swing section that is connected adjacent to the jungle gym section, wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

9. The jungle gym joint according to claim 2, wherein the flat plate portion is formed on the joint main body, and the bifurcate portion is formed on the rotary member.

10. A jungle gym having a jungle gym section comprising the jungle gym joint according to claim 9, and a swing section that is connected adjacent to the jungle gym section, wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

11. The jungle gym joint according to claim 2, wherein the flat plate portion is formed on the joint main body, and the bifurcate portion is formed on the rotary member, wherein a projecting end portion of the flat plate portion has a convexly projecting arc shape when seen from thereabove and includes a rotation restricting projection that is provided so as to project therefrom, and wherein a surface of the bifurcate portion that lies between two fork portions thereof and which faces the projecting end portion of the flat plate portion follows the projecting end portion of the flat plate portion to thereby be given a concavely depressed arc shape when seen from thereabove and includes an abutment portion that is provided thereon so as to be brought into abutment with the rotation restricting projection.

12. A jungle gym having a jungle gym section comprising the jungle gym joint according to claim 11, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon,
wherein the connection support members each comprise a support portion that supports the respective swing support vertical pipe and a sliding cylindrical portion that is fixed to a lower end of the support portion and which is formed on an outer circumference of the respective swing support base pipe,
wherein the sliding cylindrical portions each include a thread portion that is formed on an outer circumference of an end portion thereof which lies opposite to another end portion thereof facing the jungle gym section, and
wherein the two swing support base pipes each include a thread member that is provided at an end portion thereof which lies opposite to another end portion thereof facing the jungle gym section for threading engagement with the thread portion.

13. A jungle gym having a jungle gym section comprising the jungle gym joint according to claim 2, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon,
wherein the connection support members each comprise a support portion that supports the respective swing support vertical pipe and a sliding cylindrical portion that is fixed to a lower end of the support portion and which is formed on an outer circumference of the respective swing support base pipe,
wherein the sliding cylindrical portions each include a thread portion that is formed on an outer circumference of an end portion thereof which lies opposite to another end portion thereof facing the jungle gym section, and
wherein the two swing support base pipes each include a thread member that is provided at an end portion thereof which lies opposite to another end portion thereof facing the jungle gym section for threading engagement with the thread portion.

14. A jungle gym having a jungle gym section comprising the jungle gym joint according to claim 2, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon,
wherein the connection support members each comprise a support portion that supports the respective swing support vertical pipe and a sliding cylindrical portion that is fixed to a lower end of the support portion and which is formed on an outer circumference of the respective swing support base pipe,
wherein the sliding cylindrical portions each include a thread portion that is formed on an outer circumference of an end portion thereof which lies opposite to another end portion thereof facing the jungle gym section,
wherein the two swing support base pipes each include a thread member that is provided at an end portion thereof which lies opposite to another end portion thereof facing the jungle gym section for threading engagement with the thread portion,
wherein an external thread portion is formed at the end portion of each of the two swing support base pipes that lies opposite to said another end portion thereof that faces the jungle gym section,
wherein the connecting pipes and the two swing support base pipes are respectively connected to each other via swing support base folding portions, and
wherein a swing support base cover member is provided on an outer circumference of each of the swing support base folding portions, the swing support base cover member having an outside diameter that is equal to an outside diameter of the respective swing support base pipe and including an internal thread portion that is formed on a bore diameter portion for threading engagement with the external thread portion.

15. The jungle gym joint according to claim 1, wherein the flat plate portion is formed on the joint main body, and the bifurcate portion is formed on the rotary member.

16. A jungle gym having a jungle gym section comprising the jungle gym joint according to claim 15, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

17. The jungle gym joint according to claim 1,
wherein the flat plate portion is formed on the joint main body, and the bifurcate portion is formed on the rotary member, wherein a projecting end portion of the flat plate portion has a convexly projecting arc shape when seen from thereabove and includes a rotation restricting projection that is provided so as to project therefrom, and wherein a surface of the bifurcate portion that lies between two fork portions thereof and which faces the projecting end portion of the flat plate portion follows the projecting end portion of the flat plate portion to thereby be given a concavely depressed arc shape when seen from thereabove and includes an abutment portion that is provided thereon so as to be brought into abutment with the rotation restricting projection.

18. A jungle gym having a jungle gym section comprising the jungle gym joint according to claim 17, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

19. A jungle gym having a jungle gym section comprising the jungle gym joint according to claim 1, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, and wherein the two swing support base pipes each include a thread member that is provided at an end portion thereof which lies opposite to another end portion thereof facing the jungle gym section for threading engagement with the thread portion.

20. A jungle gym having a jungle gym section comprising the jungle gym joint according to claim 1, and a swing section that is connected adjacent to the jungle gym section,
wherein the swing section comprises two swing support base pipes that are respectively connected to two of the jungle gym joints at two respective locations on a setting plane via connecting pipes, two swing support vertical pipes that are respectively connected to the two swing support base pipes via connection support members and which extend upwards while being inclined, a swing support horizontal pipe that is supported detachably at both ends thereof by an intersecting portion that connects to the two swing support vertical pipes at upper end portions thereof and the jungle gym section and which spans horizontally between the intersecting portion and the jungle gym section, and a swing that is provided on the swing support horizontal pipe so as to swing freely thereon, wherein the connection support members each comprise a support portion that supports the respective swing support vertical pipe and a sliding cylindrical portion that is fixed to a lower end of the support portion and which is formed on an outer circumference of the respective swing support base pipe, wherein the sliding cylindrical portions each include a thread portion that is formed on an outer circumference of an end portion thereof which lies opposite to another end portion thereof facing the jungle gym section, wherein the two swing support base pipes each include a thread member that is provided at an end portion thereof which lies opposite to another end portion thereof facing the jungle gym section for threading engagement with the thread portion, wherein an external thread portion is formed at the end portion of each of the two swing support base pipes that lies opposite to said another end portion thereof that faces the jungle gym section, wherein the connecting pipes and the two swing support base pipes are respectively connected to each other via swing support base folding portions, and wherein a swing support base cover member is provided on an outer circumference of each of the swing support base folding portions, the swing support base cover member having an outside diameter that is equal to an outside diameter of the respective swing support base pipe and including an internal thread portion that is formed on a bore diameter portion for threading engagement with the external thread portion.

* * * * *